United States Patent
Bishoff et al.

(10) Patent No.: US 10,724,652 B2
(45) Date of Patent: Jul. 28, 2020

(54) SHUT-OFF VALVE FOR A FLUID CIRCUIT AND METHOD FOR OPERATING THE SAME

(71) Applicants: Mark Eugene Bishoff, Halifax (CA); Guy Thomas Bishoff, Lethbridge (CA)

(72) Inventors: Mark Eugene Bishoff, Halifax (CA); Guy Thomas Bishoff, Lethbridge (CA)

( * ) Notice: Subject to any disclaimer, the term of this patent is extended or adjusted under 35 U.S.C. 154(b) by 0 days.

(21) Appl. No.: 16/484,471

(22) PCT Filed: Feb. 7, 2018

(86) PCT No.: PCT/IB2018/050761
§ 371 (c)(1),
(2) Date: Aug. 8, 2019

(87) PCT Pub. No.: WO2018/146601
PCT Pub. Date: Aug. 16, 2018

(65) Prior Publication Data
US 2020/0032921 A1    Jan. 30, 2020

Related U.S. Application Data

(60) Provisional application No. 62/456,515, filed on Feb. 8, 2017.

(51) Int. Cl.
*F16K 31/56* (2006.01)
*F16K 17/04* (2006.01)
(Continued)

(52) U.S. Cl.
CPC .......... *F16K 31/563* (2013.01); *F16K 17/042* (2013.01); *F16K 17/164* (2013.01); *F16K 17/386* (2013.01)

(58) Field of Classification Search
CPC .... F16K 31/563; F16K 17/042; F16K 17/164; F16K 17/386
(Continued)

(56) References Cited

U.S. PATENT DOCUMENTS 3,630,216 A * 12/1971 Kelly .................... F16K 17/10
                                                         137/67
3,726,299 A *  4/1973 Wheatley, Jr. ........ F16K 17/386
                                                         137/75
(Continued)

FOREIGN PATENT DOCUMENTS

CN          105318091        2/2016
EP            2092223       12/2012
(Continued)

OTHER PUBLICATIONS

International Search Report and the Written Opinion dated Jul. 17, 2018 From the International Searching Authority Re. Application No. PCT/IB2018/050761. (10 Pages).

*Primary Examiner* — Minh Q Le

(57) ABSTRACT

A shut-off valve comprising a valve member received in a fluid passageway and rotatable about a rotation axis between open and closed positions, a casing mounted on the valve body and comprising a chamber, a valve actuating assembly mounted on the valve member for rotating the valve member between the open and closed positions and comprising a stem mounted on the valve member about the rotation axis, a blocking member mounted on the stem and a first biasing member configured to bias the valve actuating assembly in the closed position. The shut-off valve further comprising a biasing assembly comprising a second biasing member and a protrusion member, the protrusion member adapted for mating with the mating element of the blocking member for maintaining the valve member in the open position as pressure increases in the chamber. The valve member configured to close when pressure decreases in the chamber.

19 Claims, 25 Drawing Sheets

(51) Int. Cl.
*F16K 17/164* (2006.01)
*F16K 17/38* (2006.01)

(58) Field of Classification Search
USPC ...... 137/487.5, 104, 115.13, 115.15, 115.16, 137/115.2, 115.23, 115.25, 329.4, 456, 137/457, 461, 596.17
See application file for complete search history.

(56) References Cited

U.S. PATENT DOCUMENTS

| | | | | |
|---|---|---|---|---|
| 3,783,887 | A * | 1/1974 | Shoji | F16K 17/363 137/38 |
| 4,099,551 | A * | 7/1978 | Billington | B67D 7/36 137/38 |
| 4,270,849 | A * | 6/1981 | Kalbfleisch | F16K 5/0647 137/75 |
| 4,533,114 | A * | 8/1985 | Cory | F16K 31/055 251/67 |
| 4,589,435 | A * | 5/1986 | Aldrich | F16K 21/16 137/102 |
| 4,771,807 | A | 9/1988 | Karani | |
| 4,887,630 | A * | 12/1989 | Hill | A62C 2/242 137/72 |
| 5,050,629 | A * | 9/1991 | Willoughby | F16K 17/363 137/38 |
| 5,265,845 | A | 11/1993 | Giliam | |
| 5,771,916 | A * | 6/1998 | Armenia | D06F 39/081 137/109 |
| 6,170,509 | B1 * | 1/2001 | Karta | F16K 31/06 137/78.4 |
| 6,170,798 | B1 * | 1/2001 | Johnson | F16K 5/0652 137/312 |
| 6,533,243 | B1 * | 3/2003 | Sumner | F16K 31/563 251/303 |
| 6,550,495 | B1 * | 4/2003 | Schulze | F16K 17/38 137/457 |
| 6,651,686 | B2 * | 11/2003 | Scantlin | G05D 16/18 137/461 |
| 6,885,119 | B2 | 4/2005 | Aoki | |
| 6,899,122 | B1 * | 5/2005 | Mele | F16K 31/001 122/504 |
| 8,474,480 | B1 * | 7/2013 | Scantlin | F16K 17/406 137/102 |
| 8,499,549 | B2 * | 8/2013 | Herges | F01N 1/165 123/323 |
| 8,899,264 | B2 | 12/2014 | Young et al. | |
| 2003/0066557 | A1 * | 4/2003 | Scudder | A01C 23/024 137/68.14 |
| 2006/0005879 | A1 * | 1/2006 | Ochi | F16K 17/386 137/79 |
| 2006/0118746 | A1 * | 6/2006 | Gebler | F16K 31/003 251/129.04 |
| 2007/0085048 | A1 * | 4/2007 | Nohl | F16K 1/221 251/129.2 |
| 2009/0146090 | A1 | 6/2009 | Hashimoto et al. | |
| 2013/0104999 | A1 * | 5/2013 | McGill | F16K 31/563 137/78.1 |
| 2013/0264504 | A1 * | 10/2013 | Nimberger | F16K 31/105 251/129.03 |

FOREIGN PATENT DOCUMENTS

| | | |
|---|---|---|
| EP | 2206940 | 6/2017 |
| JP | 6014314 | 9/2016 |
| WO | WO 2018/146601 | 8/2018 |

* cited by examiner

SHUT-OFF VALVE FOR A FLUID CIRCUIT AND METHOD FOR OPERATING THE SAME

RELATED APPLICATIONS

This application is a National Phase of PCT Patent Application No. PCT/IB2018/050761 having International filing date of Feb. 7, 2018, which claims the benefit of priority under 35 USC § 119(e) of U.S. Provisional Patent Application No. 62/456,515 filed on Feb. 8, 2017. The contents of the above applications are all incorporated by reference as if fully set forth herein in their entirety.

FIELD AND BACKGROUND OF THE INVENTION

The present disclosure relates to fluid circuits, and more specifically to a shut-off valve for a fluid circuit.

Shut-off valves are widely used in various industries such as the oil, gas or chemical industries and even in residential areas to regulate and rapidly stop the flow of a fluid such as a liquid or a gas within a fluid circuit in case of an over pressure in the circuit.

Gas shut-off valves used in the gas industry are critical components as they are configured to safely shut-off the fluid circuit and prevent hazards related to abnormal pressure and/or temperature levels.

High pressure shut-off valves are installed on high pressure gas lines, before a meter assembly and typically comprise a valve body having a fluid passageway located between a fluid inlet and a fluid outlet for enabling a fluid to flow from the inlet towards the outlet. The high pressure shut-off valve further typically comprises a valve member, for instance a ball valve having a through passage and adapted to be rotated between an open position for letting the fluid flow from the inlet to the outlet and a closed position for preventing fluid flow. The high pressure shut-off valve further comprises a stem operatively connected to the valve member and a handle mounted on the stem for rotating the valve member about an axis of rotation between its open and closed position.

Unfortunately, high pressure shut-off valves are manually shut-off by an operator by rotating the valve member to the closed position. This may therefore be dangerous for the operator in case of an over pressure on the gas line. Moreover, high pressure shut-off valve tend to be void of safety members such as pressure and/or temperature regulators adapted to automatically shut-off the valve as the pressure and/or temperature reaches a predetermined value on the fluid circuit.

There is therefore a need for an improved shut-off valve adapted to overcome at least one of the above identified drawbacks.

SUMMARY OF THE INVENTION

According to a broad aspect of this invention, there is provided a shut-off valve for a fluid circuit. In this broad aspect, the shut-off valve comprises a valve body comprising a fluid passageway extending between an inlet and an outlet, the valve body comprising a valve seat located in the fluid passageway and adapted to receive a corresponding valve member rotatable about a rotation axis between an open position wherein the inlet is in fluid communication with the outlet and a closed position. The shut-off valve further comprises a casing mounted on the valve body and comprising a chamber, the chamber being in fluid communication with the fluid passageway and comprising a first aperture and a second aperture, a valve actuating assembly mounted on the valve member for rotating the valve member between the open position and the closed position, the valve actuating assembly comprising a stem operatively mounted on the valve member about the rotation axis, a blocking member mounted on the stem and comprising a mating element, and a first biasing member configured to bias the valve actuating assembly in the closed position. The shut-off valve further comprises a biasing assembly located in the chamber of the casing and configured for maintaining the valve member in the open position, the biasing assembly comprising a second biasing member and a protrusion member, the protrusion member adapted for mating with the mating element, the protrusion member secured to the second biasing member, the biasing assembly adapted to move between an engaged configuration, wherein the protrusion member extends from the chamber through the first aperture towards the mating element of the blocking member and a non-engaged configuration, wherein the protrusion member is disengaged from the mating element, wherein as the valve actuating assembly rotates the valve member to the open position, pressure in the chamber biases the biasing assembly to the engaged configuration thereby urging the protrusion member into the mating element of the blocking member for maintaining the valve member in the open position and further wherein as the pressure in the chamber decreases the biasing assembly is moved to the non-engaged configuration and the first biasing member rotates the valve member to the closed position.

In accordance with an embodiment, the second biasing member is any one of expanded and compressed when the biasing assembly is in the engaged configuration.

In accordance with an embodiment, the protrusion member comprises a pin.

In accordance with an embodiment, the blocking member comprises a cam plate.

In accordance with an embodiment, the cam plate comprises a plurality of mating elements.

In accordance with an embodiment, the mating elements comprise notches which are located at a periphery of the cam plate.

In accordance with an embodiment, the first biasing member is secured between the valve body and any one of the stem and the blocking member.

In accordance with an embodiment, the chamber is in fluid communication with the fluid passageway via a checked orifice.

In accordance with an embodiment, the shut-off valve further comprises at least one pressure relief member mounted on the chamber and adapted to release the pressure from the chamber to an ambient environment through the second aperture when any one of pressure in the fluid circuit and ambient temperature is above a given value, thereby moving the valve member to the closed position.

In accordance with an embodiment, the at least one pressure relief member is selected from a group consisting of a fusible plug and a pressure relief valve.

In accordance with an embodiment, the shut-off valve further comprises a remote controlled unit for selectively releasing pressure from the chamber to an ambient environment, the remote controlled unit comprising an actuation member and a closing member, wherein upon reception of a closing instruction, the actuation member operates the closing member for releasing pressure from the chamber through the second aperture to the ambient environment, thereby moving the valve member to the closed position.

In accordance with an embodiment, the remote controlled unit comprises a solenoid valve mounted on the chamber, the solenoid valve comprising the actuation member connected to the closing member, the closing member adapted to close the second aperture of the chamber, further wherein upon reception of the closing instruction, the actuation member moves the closing member away from the second aperture causing the second aperture to be open and thereby releasing pressure from the chamber through the second aperture to the ambient environment.

In accordance with an embodiment, the valve actuating assembly further comprises any one of a handle and a motor mounted on the stem for rotating the valve member.

According to a broad aspect, there is provided a shut-off system for a fluid circuit, the shut-off system comprising a valve member located in a fluid passageway of a valve body, the valve member movable between an open position for enabling fluid flow in the fluid passageway and a closed position, a valve actuating unit for selectively moving the valve member between the closed position and the open position, a detection unit for providing an indication of a pressure in the fluid passageway, a biasing unit operatively connected to the valve actuating unit and to the detection unit, the biasing unit for maintaining the valve actuating unit in the open position if the indication of a pressure in the fluid passageway reaches a first given value and wherein if the indication of a pressure in the fluid passageway reaches a second given value, the biasing unit releases the valve actuating unit for moving the valve member to the closed position.

In accordance with an embodiment, the detection unit further provides an indication of an ambient temperature to the biasing unit, and further wherein if the indication of an ambient temperature is above a given temperature value, the biasing unit releases the valve actuating unit for moving the valve member to the closed position.

In accordance with an embodiment, the biasing unit is capable of receiving a closing instruction for selectively releasing the valve actuating unit to move the valve member to the closed position.

According to a broad aspect, there is provided a method for operating a shut-off valve. In this broad aspect, the method comprises providing the shut-off valve in a closed position, operating the valve member to the open position for enabling fluid flow, biasing the second biasing member to maintain the valve member in the open position, obtaining a closing instruction, and closing the valve member.

In accordance with an embodiment, the shut-off valve comprises any one of a motor and a handle mounted on the stem, further wherein the operating of the valve member to the open position for enabling fluid flow comprises actuating any one of the motor and the handle.

In accordance with an embodiment, the biasing of the second biasing member to maintain the valve member in the open position further comprises engaging the protrusion member with the mating element of the blocking member.

In accordance with an embodiment, the shut-off valve comprises at least one pressure relief member, further wherein the obtaining of a closing instruction comprises using the at least one pressure relief member for detecting if pressure in the fluid circuit is above a given pressure value.

In accordance with an embodiment, the obtaining of a closing instruction comprises using the at least one pressure relief member for detecting if the ambient temperature is above a given temperature value.

In accordance with an embodiment, the shut-off valve further comprises a remote controlled unit, the remote controlled unit comprising an actuation member connected to a closing member, the closing member adapted to operatively close the second aperture of the chamber, further wherein the obtaining of a closing instruction comprises receiving, by the remote controlled unit, an electrical signal from a communication device to actuate the remote controlled unit, further wherein the closing of the valve member comprises actuating the actuation member to thereby move the closing member away from the second aperture of the chamber causing the second aperture to be open and thereby releasing pressure from the chamber to an ambient environment through the second aperture.

In accordance with an embodiment, the closing of the valve member comprises actuating the at least one pressure relief member for releasing pressure from the chamber through the second aperture.

According to a broad aspect, there is provided a kit for a shut-off valve.

BRIEF DESCRIPTION OF THE SEVERAL VIEWS OF THE DRAWINGS

Having thus generally described the nature of the disclosure, reference will now be made to the accompanying drawings, showing by way of illustration a preferred embodiment thereof and in which.

DESCRIPTION OF SPECIFIC EMBODIMENTS OF THE INVENTION

Figure 1:
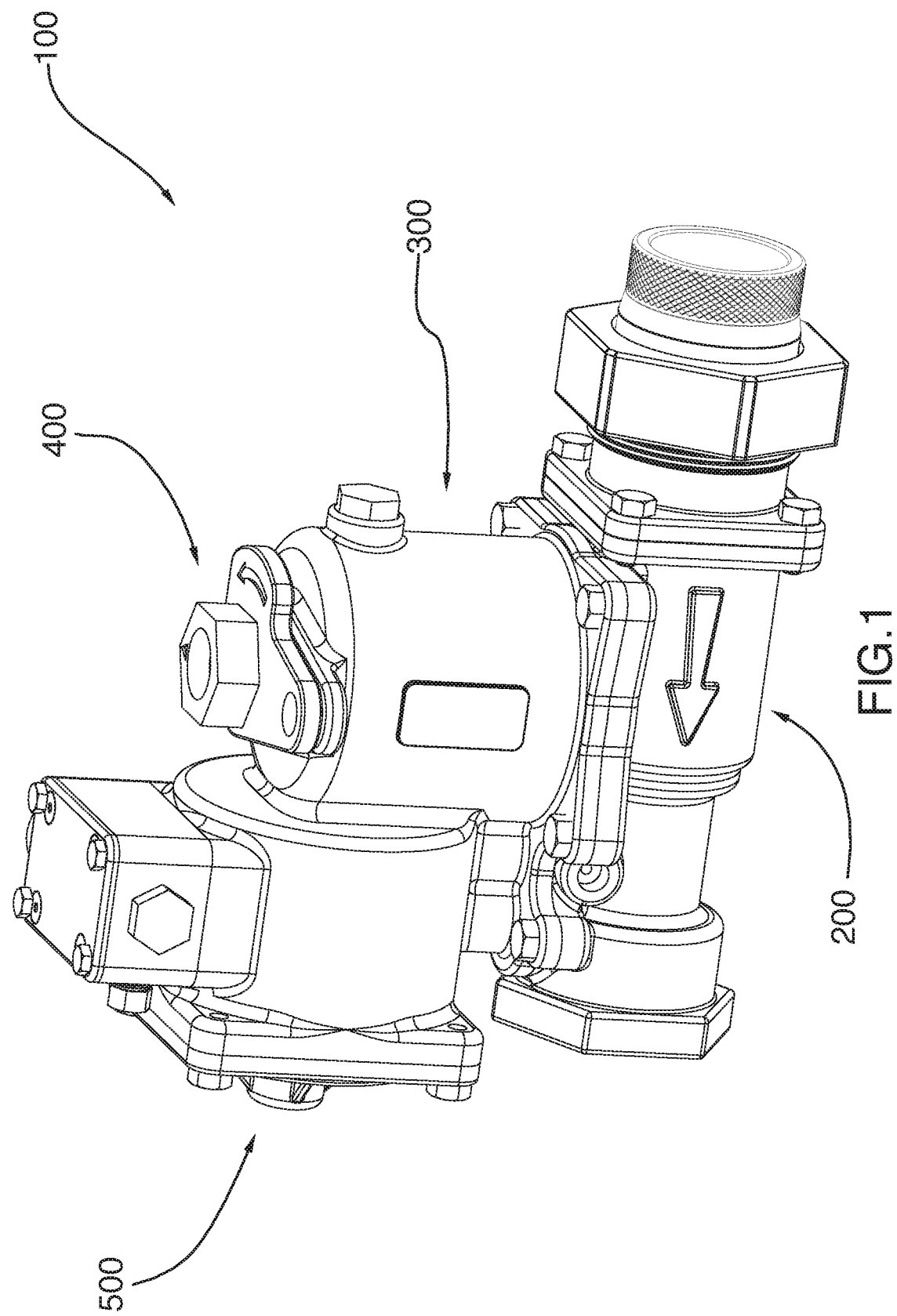
FIG. 1 is a perspective view of a shut-off valve according to one embodiment.
Figure 2:
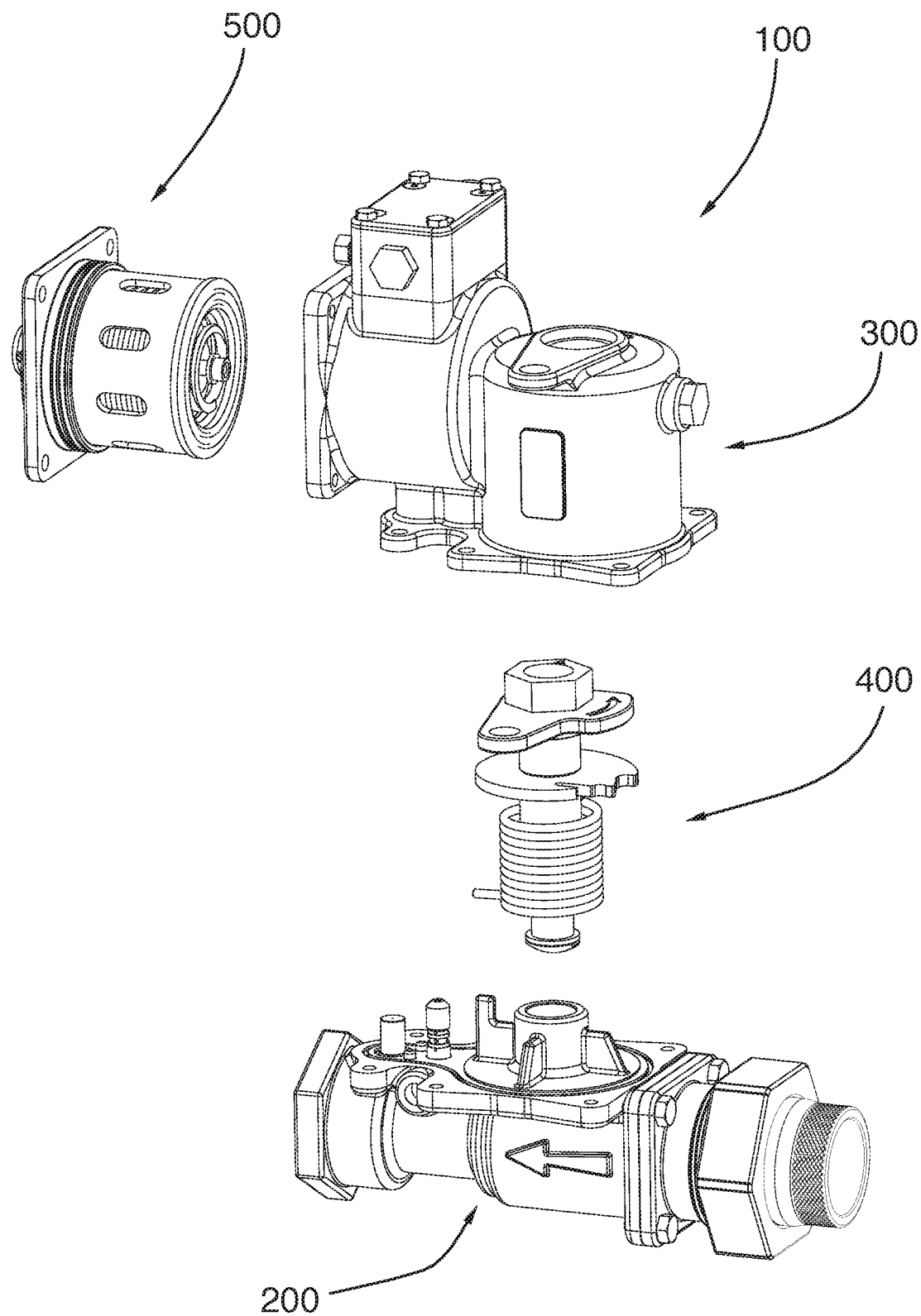
FIG. 2 is an exploded perspective view of the shut-off valve of FIG. 1 illustrating a valve body, a casing, a valve actuating assembly and a biasing assembly according to one embodiment.
Figure 3:
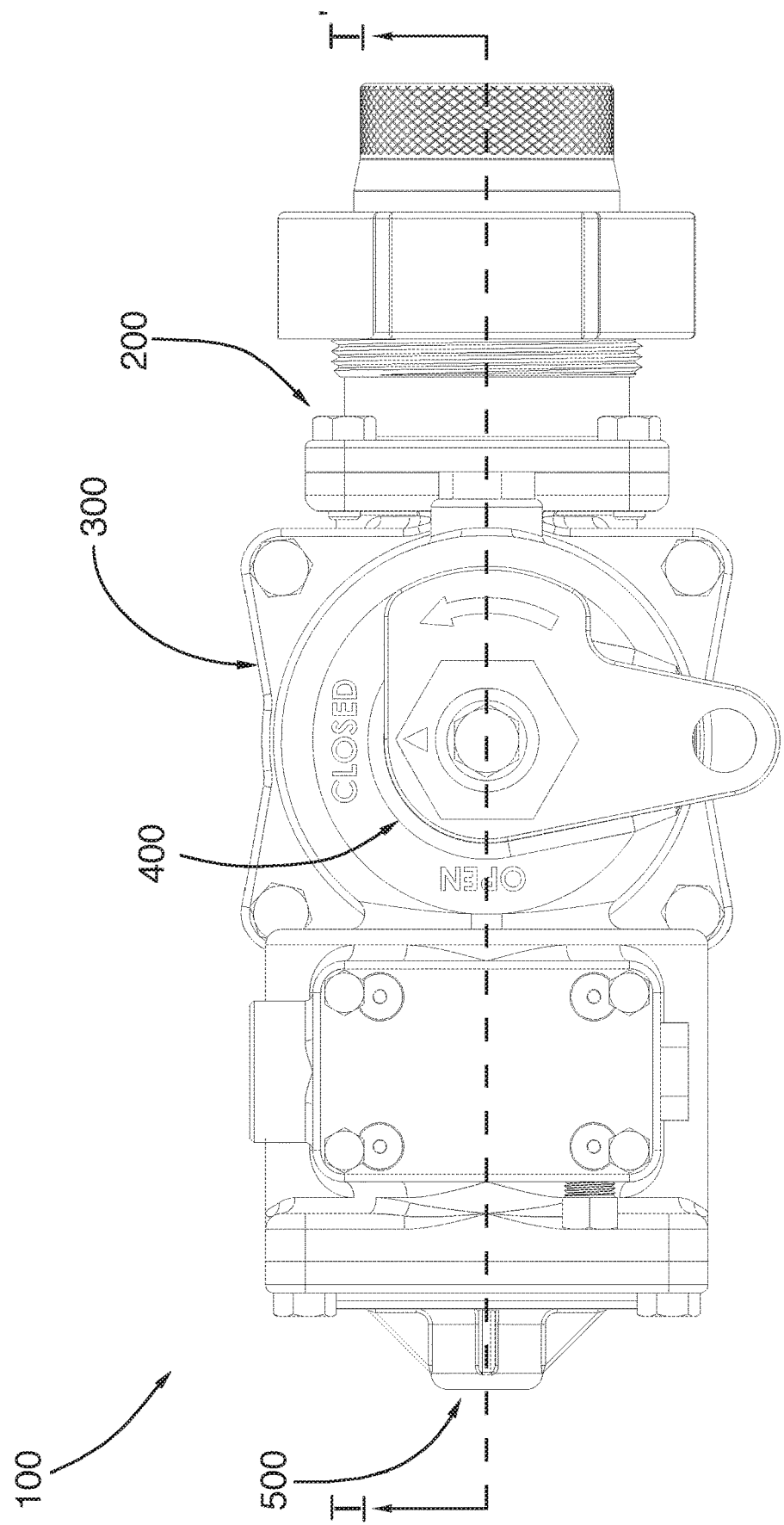
FIG. 3 is a top view of the shut-off valve of FIG. 1 according to one embodiment.
Figure 4:
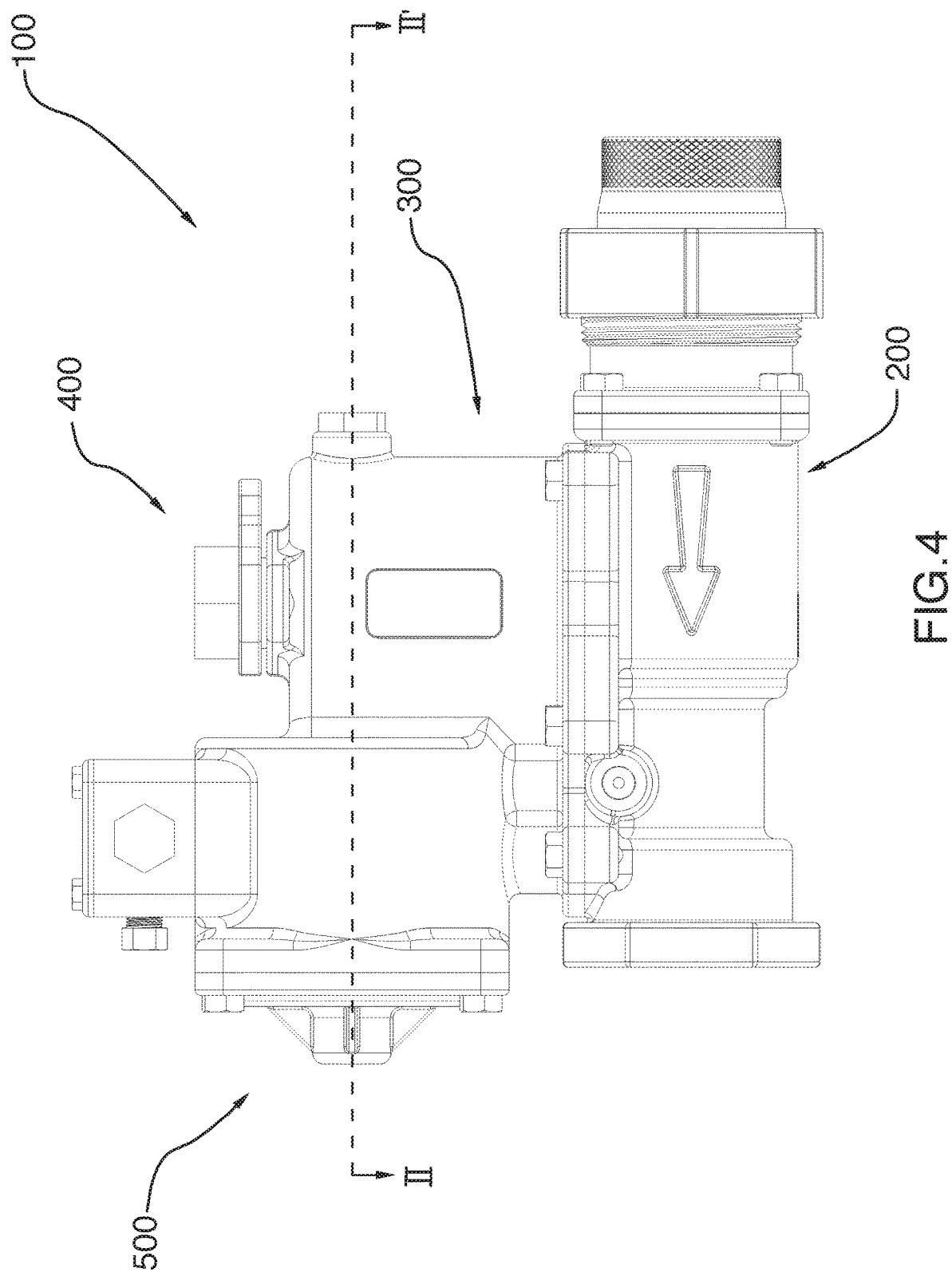
FIG. 4 is a front view of the shut-off valve of FIG. 1 according to one embodiment.

In the following description of the embodiments, references to the accompanying drawings are by way of illustration of an example by which the invention may be practiced.

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind and with reference to FIGS. 1 to 5, the present invention is directed to a shut-off valve 100 for a fluid circuit for providing an automatic shutdown of the fluid circuit. This may be performed, for instance, in the case of a fire or an overpressure condition. Alternatively, the shut-off valve 100 may automatically shut down the fluid circuit remotely.

In one embodiment, the shut-off valve 100 is a high pressure shut-off valve, configured to be installed on fluid circuits typically used in industries such as the oil, gas or chemical industry wherein the fluid can be a gas, such as natural gas, ammonia, chlorine or the like or a liquid such as water or the like. In this embodiment, the shut-off valve 100 is connected in series with gas pressure regulators located on the fluid circuit and is installed before a meter set assembly. Alternatively, the shut-off valve 100 may be installed elsewhere on a fluid circuit.

In an alternative embodiment, the shut-off valve 100 is installed on fluid circuits of residential areas, such as the gas and water circuits, for homes and residential apartments.

Figure 5:
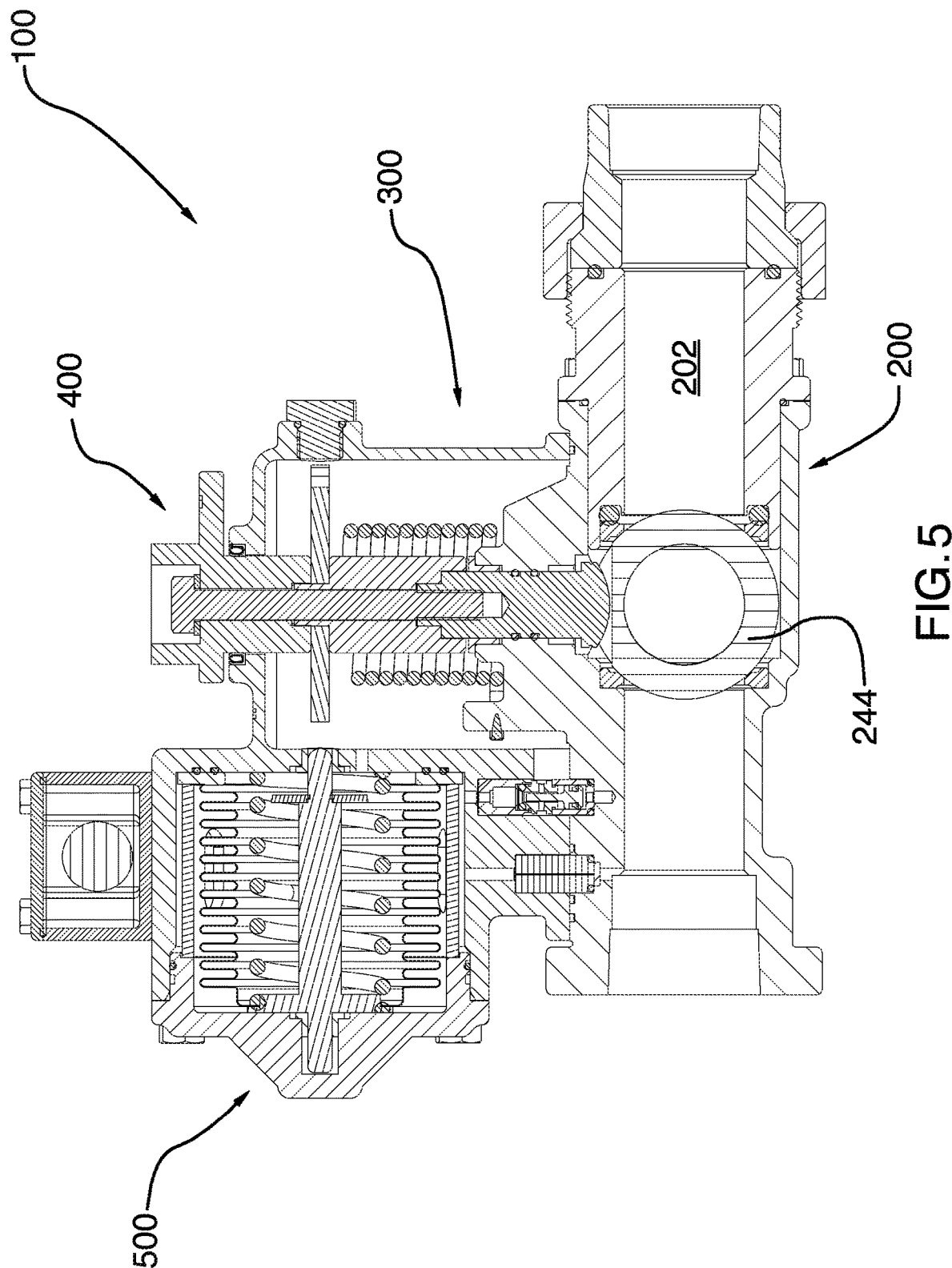
FIG. 5 is a cross-sectional view of the shut-off valve of FIG. 1, taken along line I-I' of FIG. 3 according to one embodiment.

In one embodiment shown in FIG. 5, the shut-off valve 100 comprises a valve body 200 having a movable valve member 244 seated within a fluid passageway 202. The valve member 244 is adapted to be moved by a valve actuating assembly 400 between an open position wherein fluid flows within the fluid passageway 202 and a closed position for preventing fluid flow therein. The shut-off valve 100 further comprises a biasing assembly 500 adapted to collaborate with the valve actuating assembly 400 for maintaining the valve member 244 in the open position. The shut-off valve 100 further comprises a casing 300 adapted to be mounted on the valve body 200 for covering the valve actuating assembly 400 and the biasing assembly 500.

With reference to FIGS. 6 to 9, the valve body 200 has a generally elongated tubular shape defining a fluid passageway 202 between a fluid inlet 204 and a fluid outlet 206. The valve body 200 comprises a mounting surface 208 located above and parallel to the fluid passageway 202 and extending between the fluid inlet 204 and the fluid outlet 206.

In one embodiment, the mounting surface 208 is configured for mounting the casing 300 on the valve body 200 using fasteners, as shown in FIG. 1, and comprises a positioning element 210 for mounting the valve actuating assembly 400.

The positioning element 210 has a generally cylindrical shape and is removably secured to the mounting surface 208 for enabling the positioning of the valve actuating assembly 400 therewith. In this embodiment, the positioning element 210 comprises a circular wall 212 protruding vertically away from the mounting surface 208 and defining a hole 214 in fluid communication with the fluid passageway 202. In this configuration, the circular wall 212 and the hole 214 define a rotation axis A, shown in FIG. 9, used for rotating the valve actuating assembly 400, as it will be explained in more details herein below.

Figure 8:
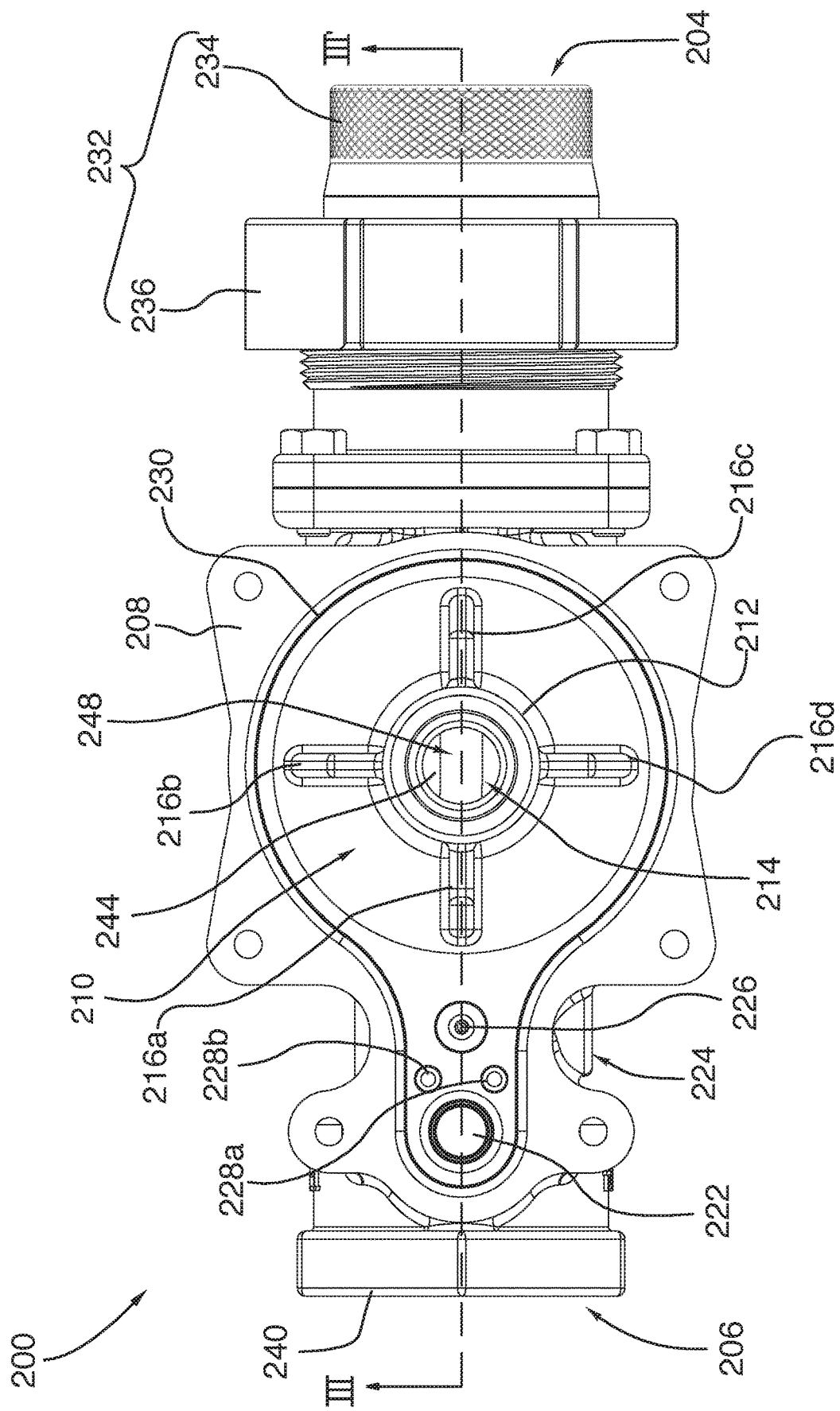
FIG. 8 is a top view of the valve body of FIG. 6 according to one embodiment.

In one embodiment shown in FIG. 8, the positioning element 210 comprises a plurality of circularly distributed protrusions 216a, 216b, 216c and 216d, extending radially from the circular wall 212. In one embodiment, the distributed protrusions 216a, 216b, 216c and 216d are equally distributed around the circular wall 212. The skilled addressee will appreciate that the number of circularly distributed protrusions 216a, 216b, 216c and 216d may vary. For instance and in one embodiment, the positioning element 210 comprises more than four circularly distributed protrusions. In an alternative embodiment, the positioning element 210 comprises only one protrusion.

In one embodiment shown in FIG. 6, the protrusion 216a comprises an upper portion 218 extending vertically therefrom, above the circular wall 212, for securing a first biasing member of the valve actuating assembly 400, as it will be explained in more details herein below.

Figure 9:
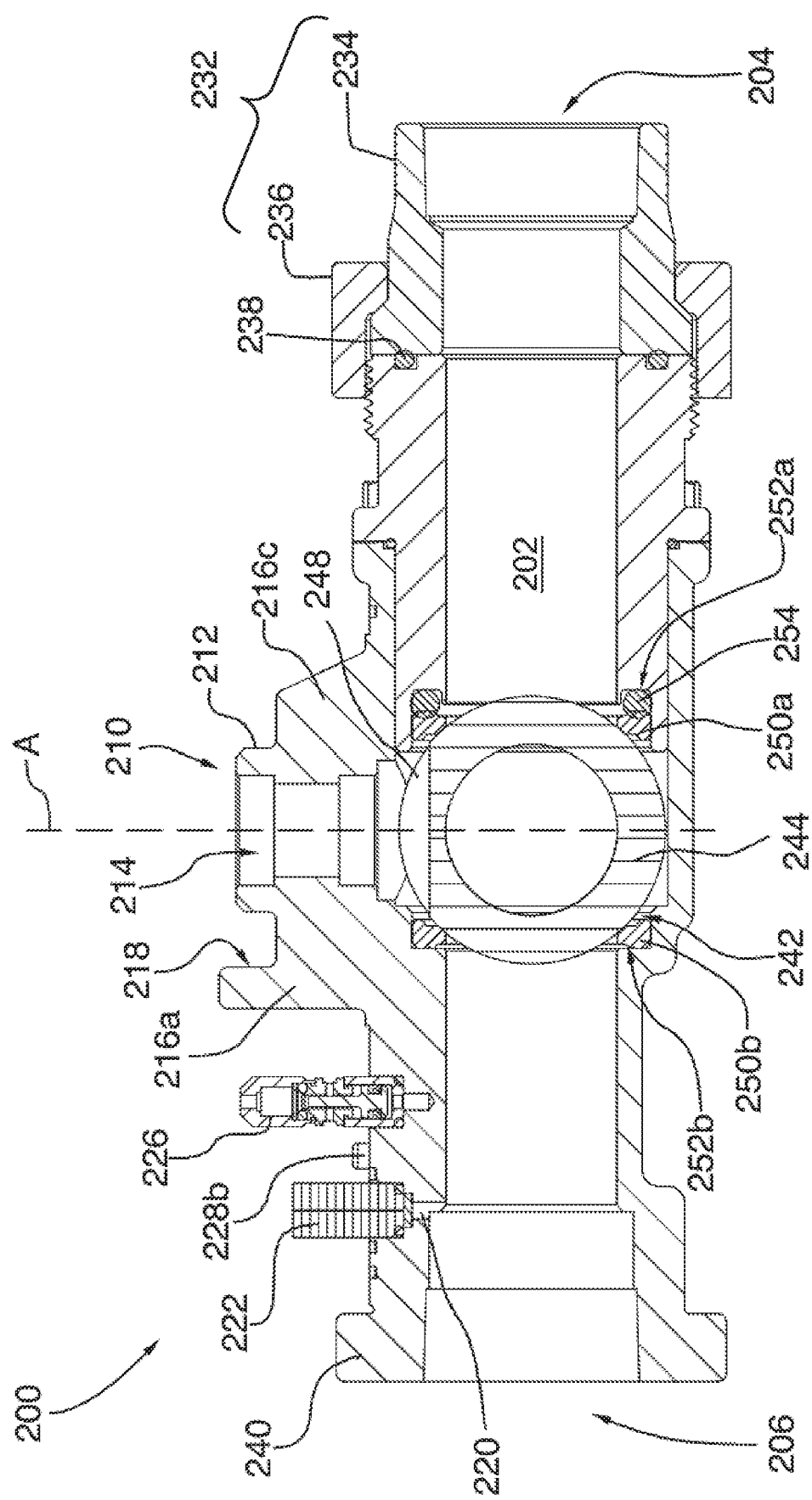
FIG. 9 is a cross-sectional view of the valve body, taken along line III-III' of FIG. 8 according to one embodiment.

In a high pressure configuration of the shut-off valve 100, shown in FIG. 9, the mounting surface 208 further comprises a communication channel 220, in fluid communication with the fluid passageway 202, for conveying fluid from the fluid passageway 202 towards the biasing assembly 500. The communication channel 220 is configured to receive an orifice 222 for limiting the fluid flow from the fluid passageway 202 towards the biasing assembly 500. In one embodiment, the orifice 222 comprises a checked orifice allowing fluid to circulate from the fluid passageway 202 towards the biasing assembly 500 but preventing fluid from circulating from the biasing assembly 500 towards the fluid passageway 202.

Figure 6:
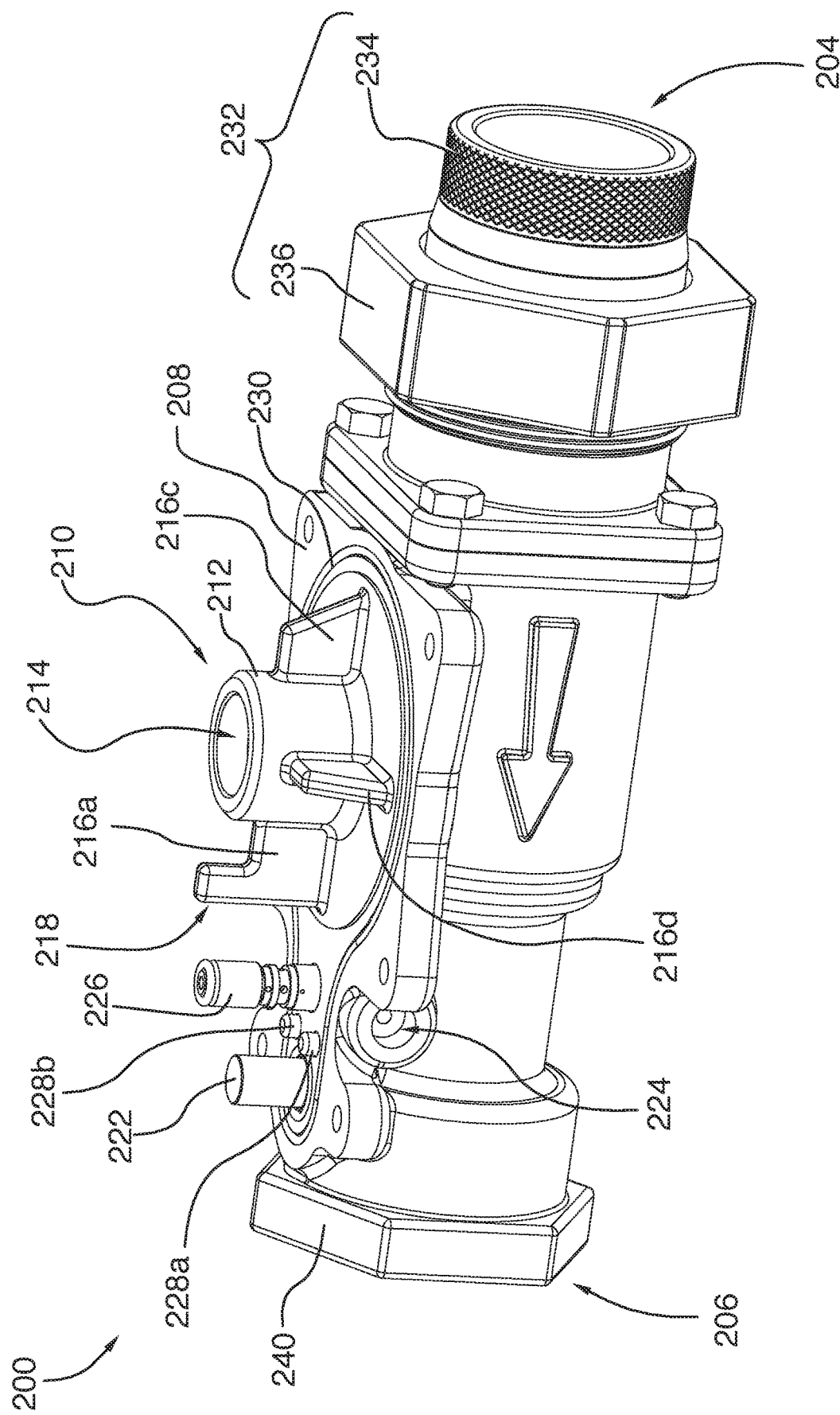
FIG. 6 is a perspective view of the valve body of FIG. 2 according to one embodiment.
Figure 7:
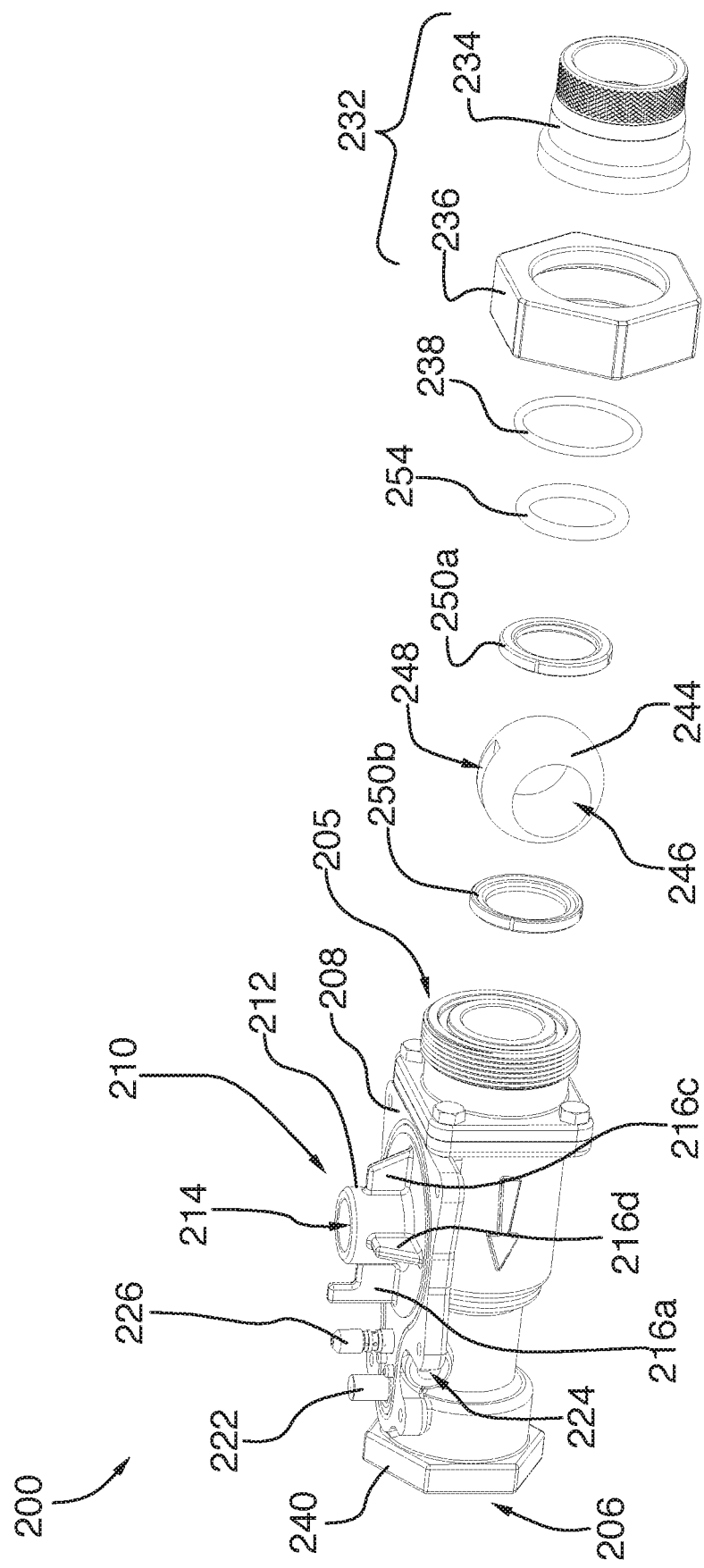
FIG. 7 is an exploded perspective view of the valve body of FIG. 6 illustrating a fitting for connecting to a fluid circuit, a valve member and a pair of seat inserts according to one embodiment.

The mounting surface 208 further comprises a fluid input 224, shown in FIG. 6, in fluid communication with a pressure relief member such as a pressure relief valve 226. Although not shown, in one embodiment, the fluid input 224 is operatively connected to a pressure regulator of the fluid circuit. As it will be better explained later, in an over pressure condition wherein a pressure regulator of the fluid circuit fails, high pressure fluid travels to the fluid input 224 causing the pressure relief valve 226 to be actuated to close the shut-off valve 100.

In one embodiment, the pressure relief valve 226 comprises a Kepner® valve. The skilled addressee will appreciate that other pressure relief valves may be used.

Although in the illustrated embodiment shown in FIGS. 6 to 9, the communication channel 220 with the orifice 222 and the fluid input 224 with the pressure relief valve 226 are located proximate to the fluid outlet 206, it will be appreciated by the skilled addressee that they may be located proximate to the fluid inlet 204, upstream of the positioning element 210. Alternatively, the communication channel 220 with the orifice 222 and the fluid input 224 with the pressure relief valve 226 may be located anywhere on the valve body 200 between the fluid inlet 204 and the fluid outlet 206.

In one embodiment shown in FIGS. 6 and 8, the mounting surface 208 further comprises a pair of dowel pins 228a and 228b extending vertically therefrom and a sealing member 230 for appropriately positioning and sealing the casing 300 when it is mounted thereon.

In one embodiment, the fluid inlet 204 of valve body 200 is connected in series to the fluid circuit, not shown, via a fitting 232 comprising an union tailpiece 234 secured by a union nut 236.

In one embodiment shown in FIG. 9, the union nut 236 is screwed to a flange 205 of the fluid body 200 for securing the union tailpiece 234 thereto. In this embodiment, a union sealing member 238 is positioned between the union tailpiece 234 and the flange 205 of the valve body 200 for fluidly sealing the fluid inlet 204.

In one embodiment, the union sealing member 238 comprises an O-ring. It will be appreciated by the skilled addressee that other sealing members may be used.

In an alternative embodiment, the fitting 232 may be secured to the flange 205 by other securing methods such as welding, soldering or the like.

In one embodiment, the fluid outlet 206 of the valve body 200 comprises an end flange 240 adapted to connect the shut-off valve 100 to the fluid circuit downstream of the valve body 200.

In one embodiment shown in FIG. 9, the valve body 200 further comprises a valve seat 242 located in the fluid passageway 202 and configured to receive a corresponding movable valve member 244. In one embodiment, the valve member 244 is movable about the rotation axis A, between an open position in which a fluid can circulate throughout the fluid passageway 202 from the fluid inlet 204 towards the fluid outlet 206 and a closed position in which the fluid is prevented from circulating through the fluid passageway 202.

In one embodiment, the valve member 244 comprises a ball valve. The skilled addressee will appreciate that other valve members rotatable between an open position and a closed position may be alternatively used. For instance, the valve member 244 may be a movable plate positioned within the fluid passageway 202 and movable between the open and the closed positions.

In one embodiment, the ball valve has a spherical shape and comprises a through channel 246 to thereby let fluid flow in the fluid passageway 202 when in the open position. The ball valve further comprises a first engagement element 248, such as a slot or a groove.

In one embodiment, the ball valve is positioned in the fluid passageway 202 by aligning the through channel 246 with the fluid passageway 202. In this embodiment, the first engagement element 248 is aligned with the hole 214 and is perpendicular relative the rotation axis A, shown in FIG. 9.

Still with reference to FIG. 9, in one embodiment, the valve seat 242 comprises seat inserts 250a and 250b which provide smooth rotation of the ball valve about the rotation axis A between the open position wherein the through channel 246 is aligned with the fluid passageway 202 and a closed position wherein the through channel 246 is perpendicular to the fluid passageway 202. The seat inserts 250a and 250b are disposed on each side of the ball valve and abut against recesses 252a and 252b of the fluid passageway 202 for maintaining the ball valve. The valve seat 242 further comprises a sealing member 254 interposed between the seat insert 250a and the recess 252a for preventing fluid leakage from the fluid passageway 202 around the ball valve.

In one embodiment, the sealing member 254 comprises an O-ring having an internal diameter substantially similar to the diameter of the fluid passageway 202. It will be appreciated by a skilled addressee that other sealing members may alternatively be used.

In one embodiment, the valve body 200 and the ball valve are made of metal, such as stainless steel and the seat inserts 250a and 250b are made of plastic, such as Polytetrafluoroethylene (PTFE), although other material may be considered by the skilled addressee.

Figure 10:
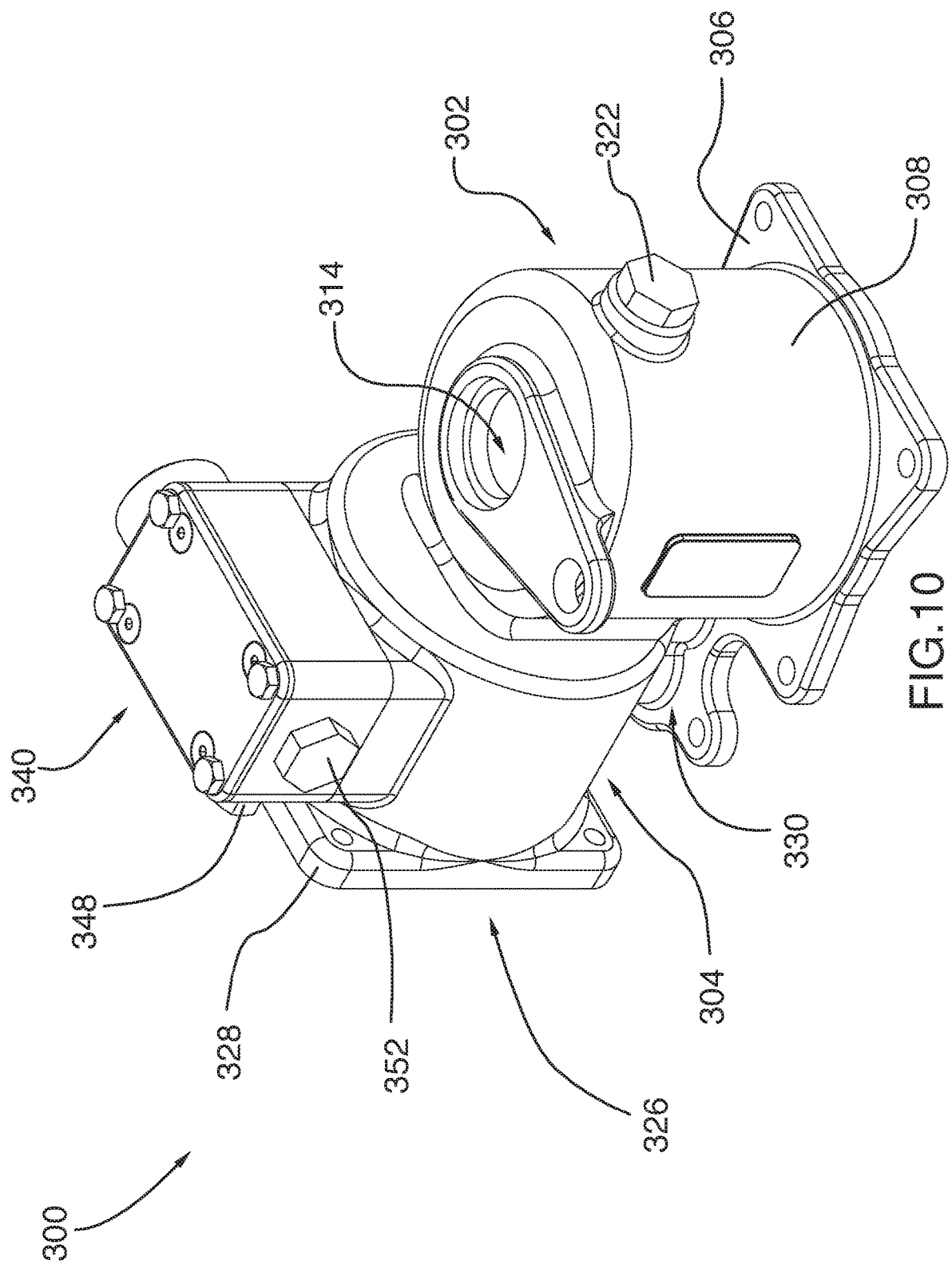
FIG. 10 is a perspective view of the casing of FIG. 2 according to one embodiment.

With reference to FIG. 10, the shut-off valve 100 comprises a casing 300 adapted to cover the valve actuating assembly 400 and the biasing assembly 500. In this embodiment, the casing 300 comprises a first chamber 302, a second pressure chamber 304 extending from the first chamber 302 and a securing plate 306 extending from the first chamber 302 to the second pressure chamber 304 and adapted to be secured to the mounting surface 208 using fasteners.

Figure 11:
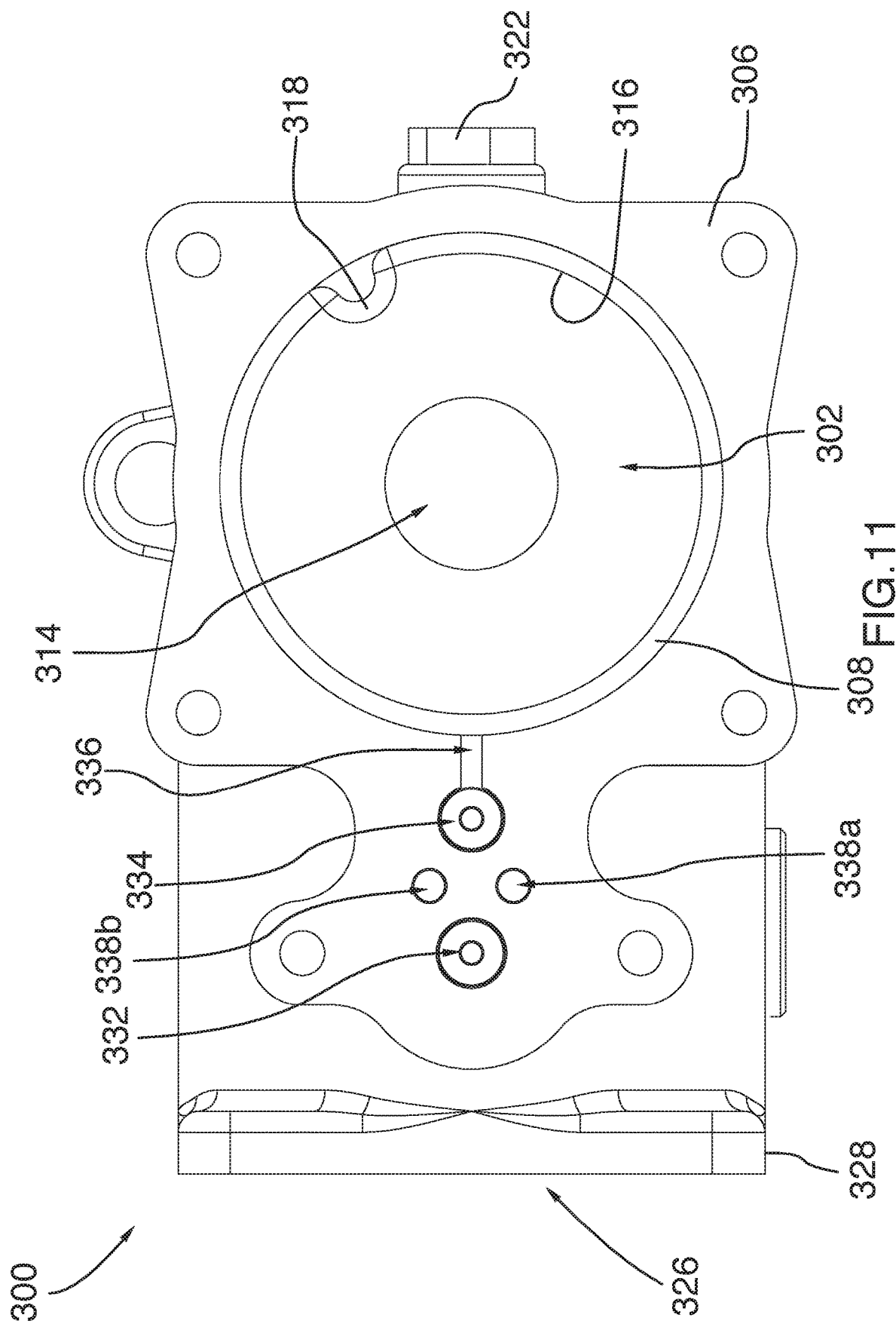
FIG. 11 is a bottom view of the casing of FIG. 10 showing the first chamber according to one embodiment.
Figure 13:
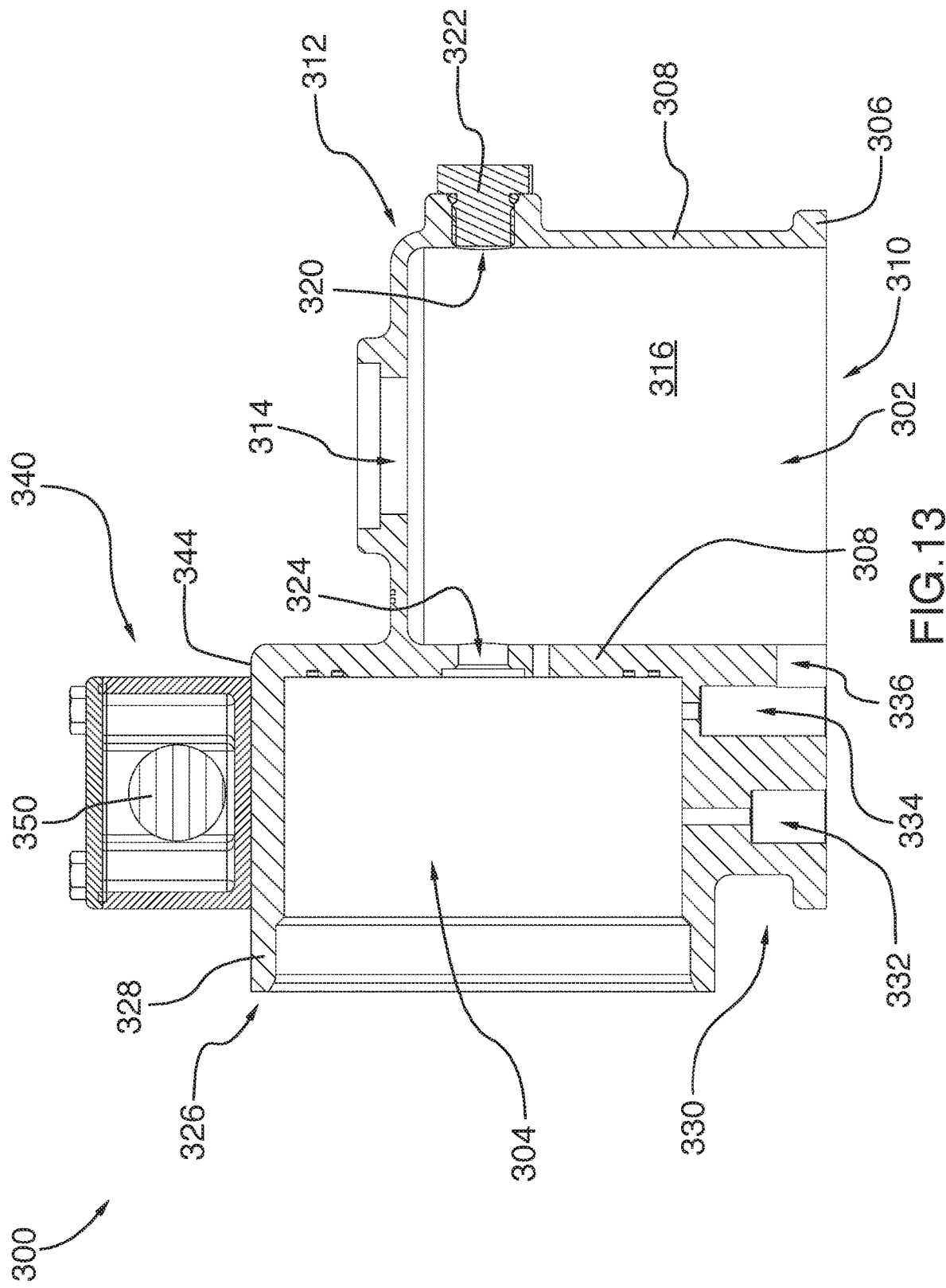
FIG. 13 is a cross-sectional view of the casing, taken along line IV-IV' of FIG. 12 according to one embodiment.

In one embodiment shown for instance in FIGS. 11 and 13, the first chamber 302 has a generally cylindrical shape adapted to cover the valve actuating assembly 400. The first chamber 302 comprises a circular wall 308 extending vertically upwardly from an open lower end 310, flush with the securing plate 306, to an upper end 312 comprising a concentric hole 314. In one embodiment, the internal surface 316 of the wall 308 comprises a radial rib 318 extending from the open lower end 310 to the upper end 312. In one embodiment, the wall 308 further comprises an opening 320, located at the upper end 312 thereof, configured to receive a first venting member 322 for releasing pressure from the second pressure chamber 304 to the ambient environment. The wall 308 further comprises a first aperture 324 extending from the first chamber 302 to the second pressure chamber 304.

Figure 12:
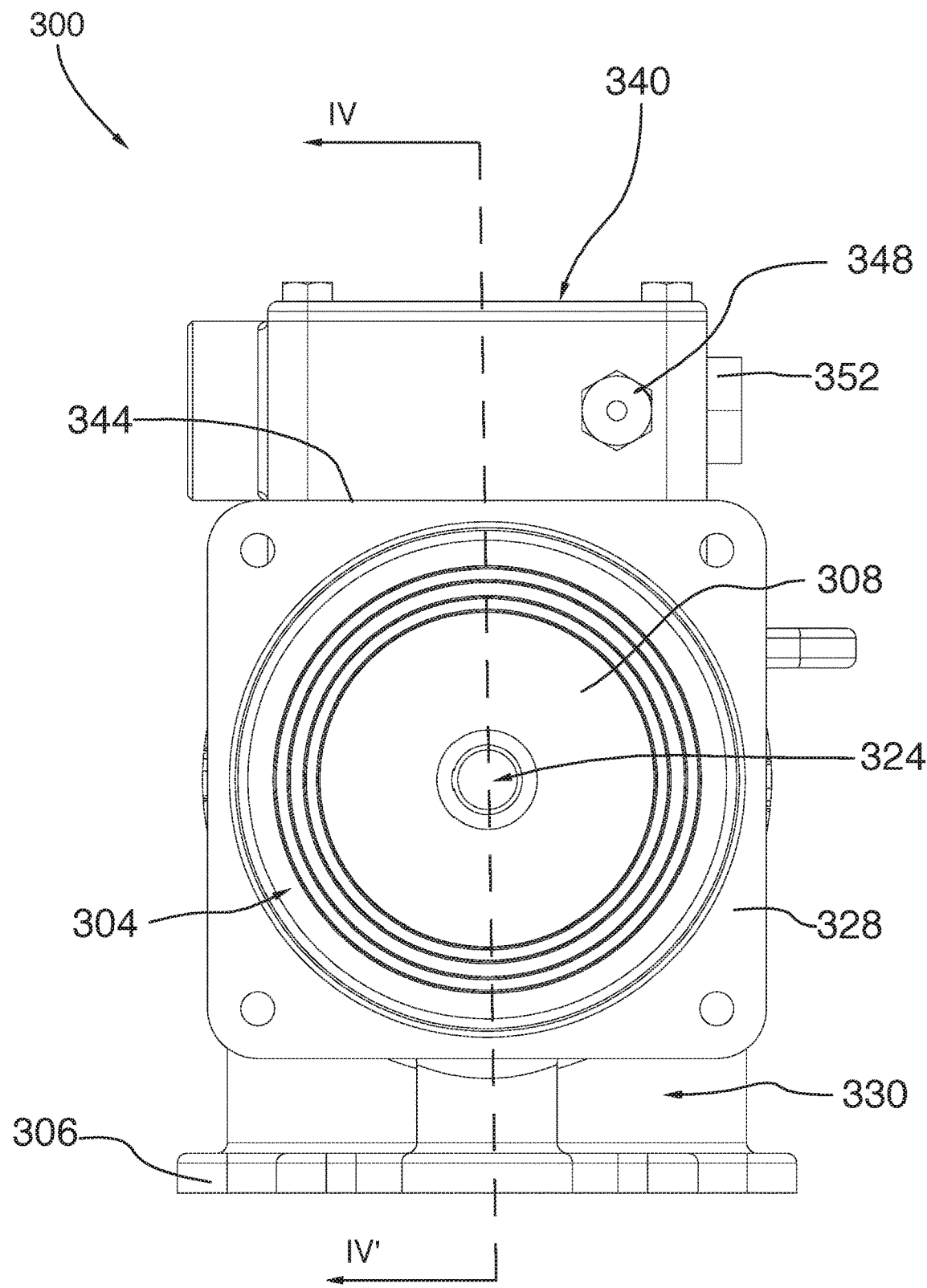
FIG. 12 is a left side view of the casing of FIG. 10 showing the second pressure chamber according to one embodiment.

In one embodiment shown in FIGS. 12 and 13, the second pressure chamber 304 has a generally cylindrical shape adapted to receive the biasing assembly 500. The second pressure chamber 304 extends from an open first end 326 comprising an end flange 328 to the wall 308 of the first chamber 302. The second pressure chamber 304 further comprises a lower portion 330 having a first passage 332 for receiving the checked orifice 222 of the valve body 200 and a second passage 334 for receiving the pressure relief valve 226. The second passage 334 is further in fluid communication with the first chamber 302 through an opening 336 adapted to convey fluid from the second pressure chamber 304 to the first chamber 302 when the pressure relief valve 226 is operated. The fluid is further released through the first venting member 322. The lower portion 330 further comprises a pair of holes 338a and 338b for receiving the dowel pin 228a and 228b of the mounting surface 208.

Figure 14:
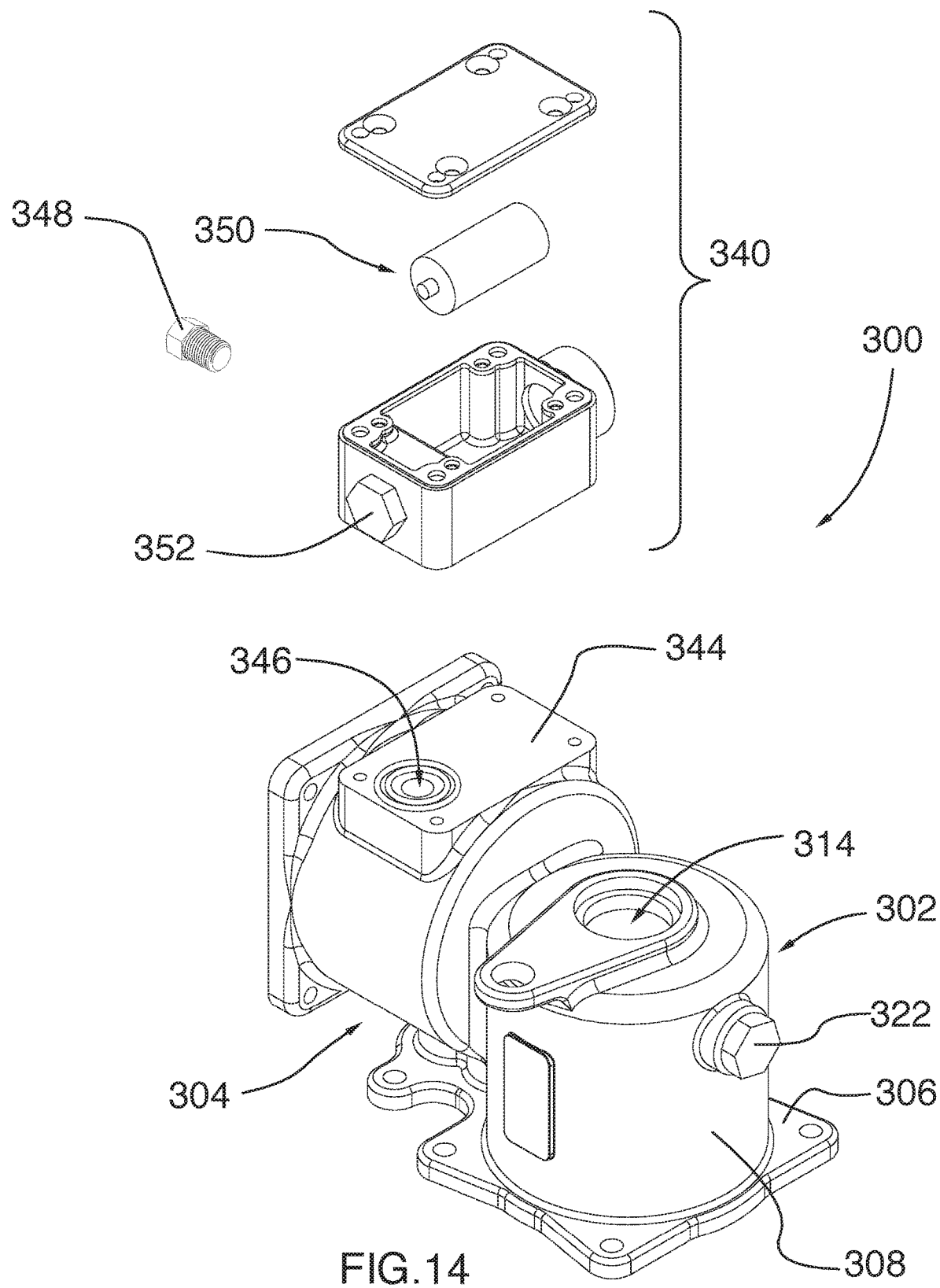
FIG. 14 is a perspective exploded view of the casing illustrating a compartment housing a remote controlled unit according to one embodiment.

In one embodiment shown for instance in FIG. 14, the second pressure chamber 304 further comprises a receiving surface 344 in fluid communication with the second pressure chamber 304 through a second aperture 346 and adapted to secure a compartment 340. The compartment 340 has a box shape onto which a pressure relief member 348, such as a fusible plug, is mounted. The fusible plug comprises a pin core, not shown, which melts in cases where the temperature is greater than a given value, for instance in the case of a fire. As the pin core melts, it enables fluid from the second pressure chamber 304 to be released to the ambient environment. The compartment 340 is further adapted to receive a remote controlled unit 350 for selectively releasing pressure from the second pressure chamber 304 to the ambient environment. In this embodiment, the remote controlled unit 350 comprises a solenoid valve adapted to receive a closing instruction from a communication device such as a smartphone, a tablet or a computer. Upon reception of the closing instruction, the solenoid valve is actuated and enables fluid communication between the second pressure chamber 304 and the ambient environment through a second venting member 352 mounted on the compartment 340.

In one embodiment, the pin core of the fusible plug melts at 165° F. Alternatively, a different fusible plug having a different pin core melting temperature may be used.

In one embodiment, the first and second venting members 322 and 352 comprise Gore® vents. The skilled addressee will appreciate that other venting members may be used.

In one embodiment, the casing 300 is made of malleable iron such ASTM A197. The skilled addressee will appreciate that other metals may be contemplated.

Figure 15:
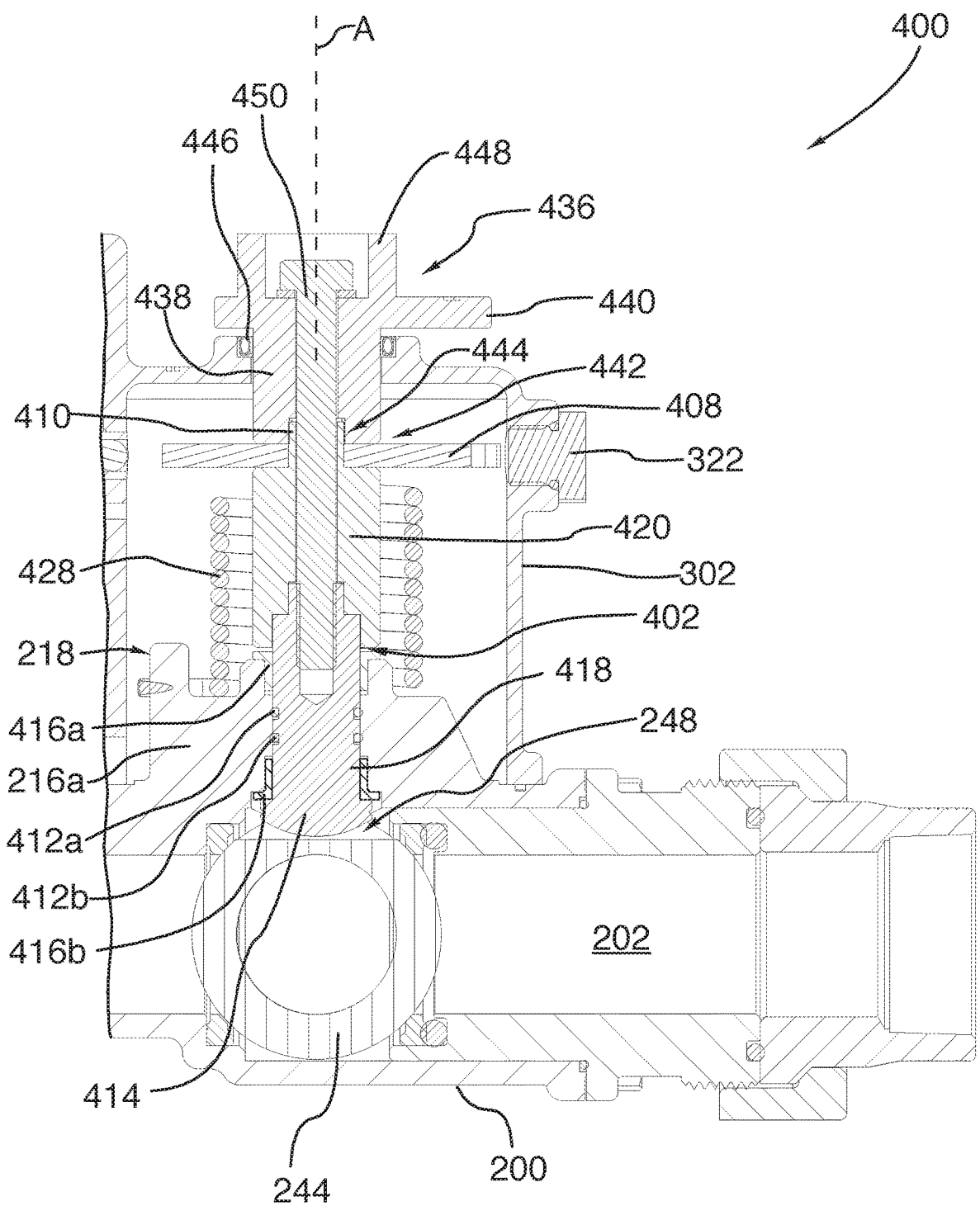
FIG. 15 is a cut out cross-sectional view of the shut-off valve, taken along the line I-I' of FIG. 3, illustrating the valve actuating assembly located in the first chamber of the casing according to one embodiment.

With reference to FIG. 15, the shut-off valve 100 comprises a valve actuating assembly 400, received in the first chamber 302 of the casing 300, and configured to rotate the valve member 244 about the rotation axis A between the open position and the closed position.

In one embodiment and still with reference to FIG. 15, the valve actuating assembly 400 comprises a stem 402 having a generally cylindrical shape extending between a lower portion 404 connected to the valve member 244 and an upper portion 406 connected to a blocking member 408 via an obround protrusion 410.

Figure 17:
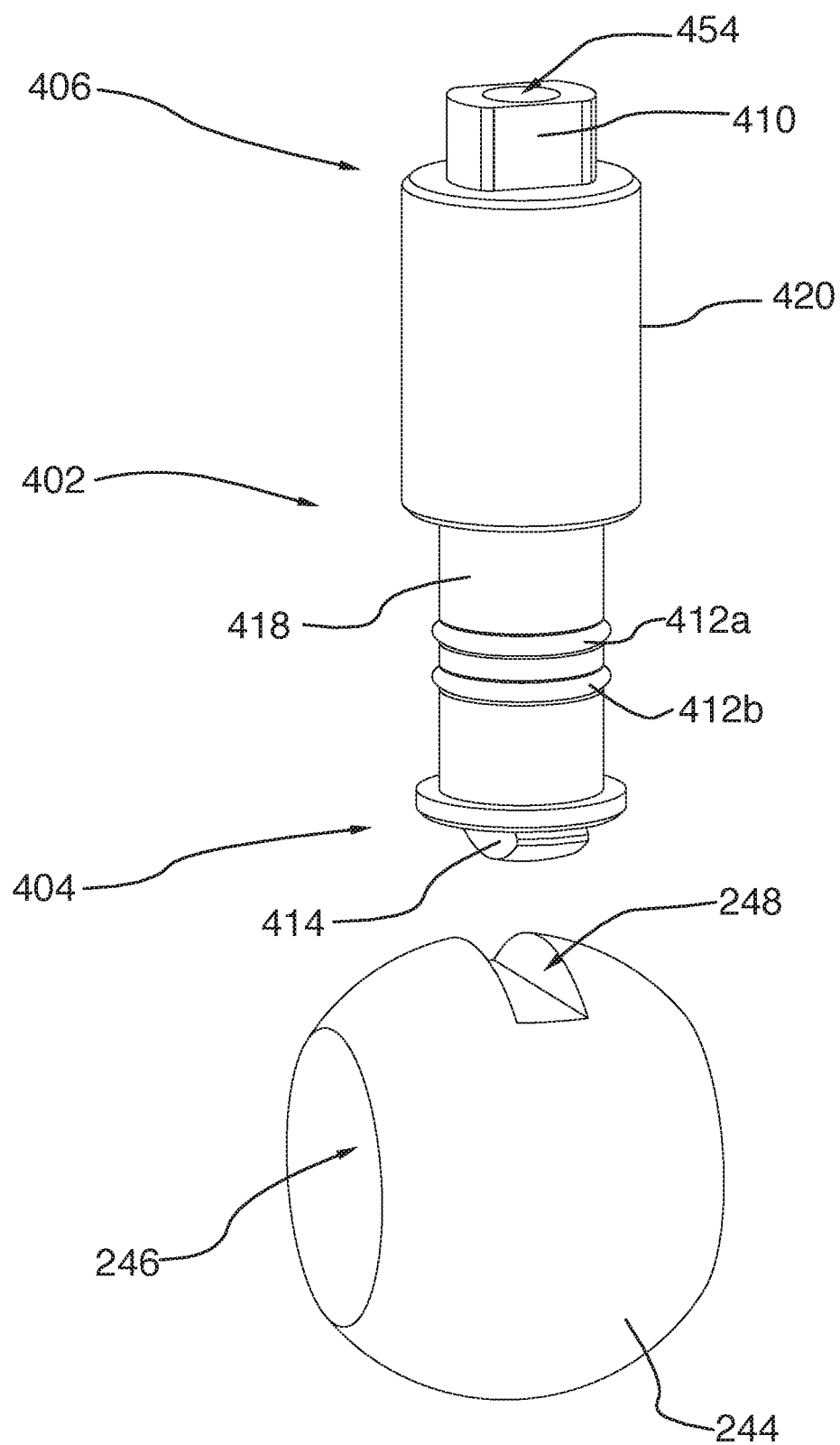
FIG. 17 is a perspective view illustrating the securing of the stem with the valve member according to one embodiment.

The stem 402 comprises, at the lower portion 404 thereof, a pair of sealing members 412a and 412b for sealingly fitting through the hole 214 of the positioning element 210 to prevent fluid leakage from the fluid passageway 202 towards the first chamber 302. At the lower portion 404, the stem 402 further comprises a second engagement element 414 configured to be inserted in the corresponding first engagement element 248 of the ball valve 244, as shown in FIGS. 15 and 17. A pair of stem bushings 416a and 416b are further mounted around the lower portion 404 of the stem 402, between the upper end of the circular wall 212 and the lower end of the hole 214, and enable a smooth rotation of the stem 402 about the rotation axis A In one embodiment, the second engagement element 414 is a convex protrusion. The skilled addressee will appreciate that other shapes may alternatively be used.

In one embodiment, the sealing members 412a and 412b comprises O-rings. The skilled addressee will appreciate that other sealing members may alternatively be used.

In one embodiment shown in FIG. 17, the stem 402 comprises a lower stem 418 connected to the valve member 244 and an upper stem 420 connected to the blocking member 408. In this embodiment, the lower stem 418 and the upper stem 420 are secured together about the rotation axis A.

The blocking member 408 has a generally circular shape defining a concentric obround opening 422 sized and shaped for receiving the obround protrusion 410 of the stem 402. The blocking member 408 further comprises peripheral mating elements 424a, 424b and 424c and a distal slot 426.

In one embodiment, the blocking member 408 comprises a cam plate wherein the mating elements 424a, 424b and 424c are notches located at a periphery of the cam plate.

In one embodiment, the mating element 424a contacts the radial rib 318 of the first chamber 302 when the valve member 244 is in the closed position. Furthermore, as the valve actuating assembly 400 is rotated, the blocking member 408 rotates the mating element 424c in alignment with the first aperture 324 for engaging a protrusion member from the biasing assembly 500, as it will be explained in more details below.

Figure 16:
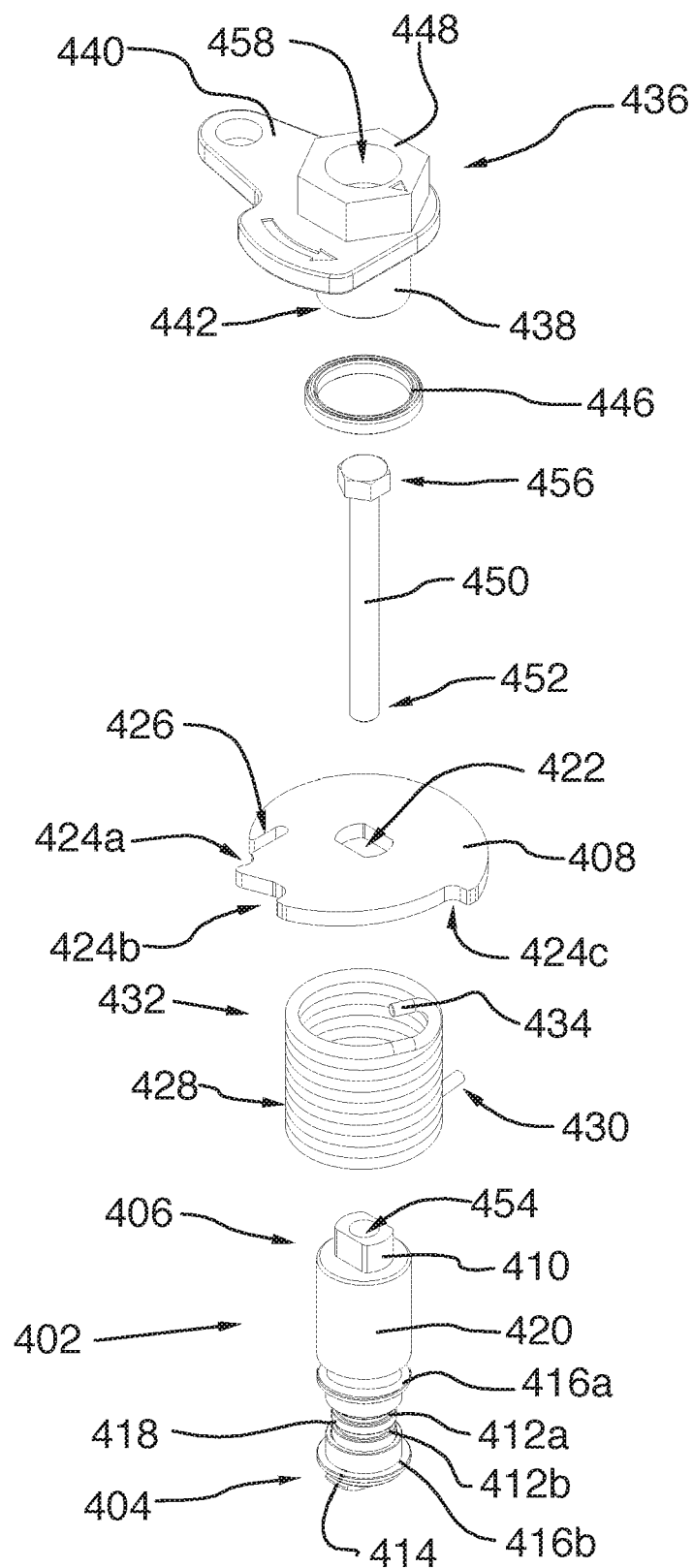
FIG. 16 is an exploded perspective view of the valve actuating assembly illustrating a stem, a first biasing member, a blocking member, an elongated shaft, a radial seal and a handle according to one embodiment.

Although in the illustrated embodiment shown in FIG. 16, the blocking member 408 comprises three mating elements 424a, 424b and 424c, it will be understood by the skilled addressee that a different number of mating elements may be contemplated. For instance, the blocking member 408 may comprise only one mating element.

In one embodiment shown in FIG. 16, the valve actuating assembly 400 further comprises a first biasing member 428 adapted to bias the valve actuating assembly 400 and therefore the valve member 244 about the rotation axis in the closed position. In this embodiment, the first biasing member 428 is a torsion spring coiled around the stem 402 between the positioning element 210 and the blocking member 408. More precisely, the first biasing member 428 comprises a lower end 430 secured to the upper portion 218 of the protrusion 216a of the circular wall 212 and an upper end 432 defining a hook like portion 434, received in the distal slot 426 of the blocking member 408. In an alternative embodiment, not shown, the first biasing member 428 may comprise a lower end 430 secured to the upper portion 218 of the protrusion 216a of the circular wall 212 and an upper end 432 secured to the stem 402.

It will be appreciated by the skilled addressee that other biasing members may be used for biasing the valve actuating assembly 400, and therefore the valve member 244, in the closed position. For instance, hydraulic or pneumatic biasing members may be used.

In one embodiment shown in FIGS. 15 and 16, the valve actuating assembly 400 further comprises a handle 436 mounted on the blocking member 408 for rotating the valve actuating assembly 400 and therefore the valve member 244 about the rotation axis A. In this embodiment, the handle 436 has a generally cylindrical body 438 from which a radial protrusion 440 perpendicularly extends. The cylindrical body 438 has a lower portion 442 sized and shaped to fit in the concentric hole 314 of the first chamber 302, as shown in FIG. 15. The lower portion 442 comprises an obround cavity 444 configured to receive the obround protrusion 410 of the stem 402. The lower portion 442 further comprises a radial seal 446 for enabling a smooth rotation of the handle 436 about the rotation axis A and preventing the fluid flowing in the first chamber 302 towards the first venting member 322 to leak.

The cylindrical body 438 further comprises a nut shaped upper portion 448 which enables an operator using a wrench to rotate the valve actuating assembly 400 and therefore the valve member 244 to the open position. Alternatively, the radial protrusion 440 enables an operator to rotate the valve actuating assembly 400 and therefore the valve member 244.

Although not shown in FIG. 15, it will be appreciated by the skilled addressee that in an alternative embodiment, a motor may be coupled to the stem 402 for rotating valve actuating assembly 400 and therefore the valve member 244 to the open position.

In one embodiment shown in FIGS. 15 and 16, the valve actuating assembly 400 further comprises an elongated shaft 450 for axially securing the stem 402, the blocking member 408 and the handle 436 tightly together about the rotation axis A. More precisely, the elongated shaft 450 comprises a lower end 452 secured to the hole 454 of the obround protrusion 410 of the stem 402 and an upper end 456 secured to the hole 458 of the obround cavity 444 of the handle 436. In this configuration, the elongated shaft 450 further extends through the obround opening 422 of the blocking member 408.

In one embodiment, the elongated shaft 450 comprises an elongated bolt.

It will be appreciated by the skilled addressee that other securing members different from the elongated shaft 450 may be used.

In one embodiment, the blocking member 408, the handle 436, the stem 402 are made of stainless steel. The skilled addressee will appreciate that other material may be used.

Figure 18:
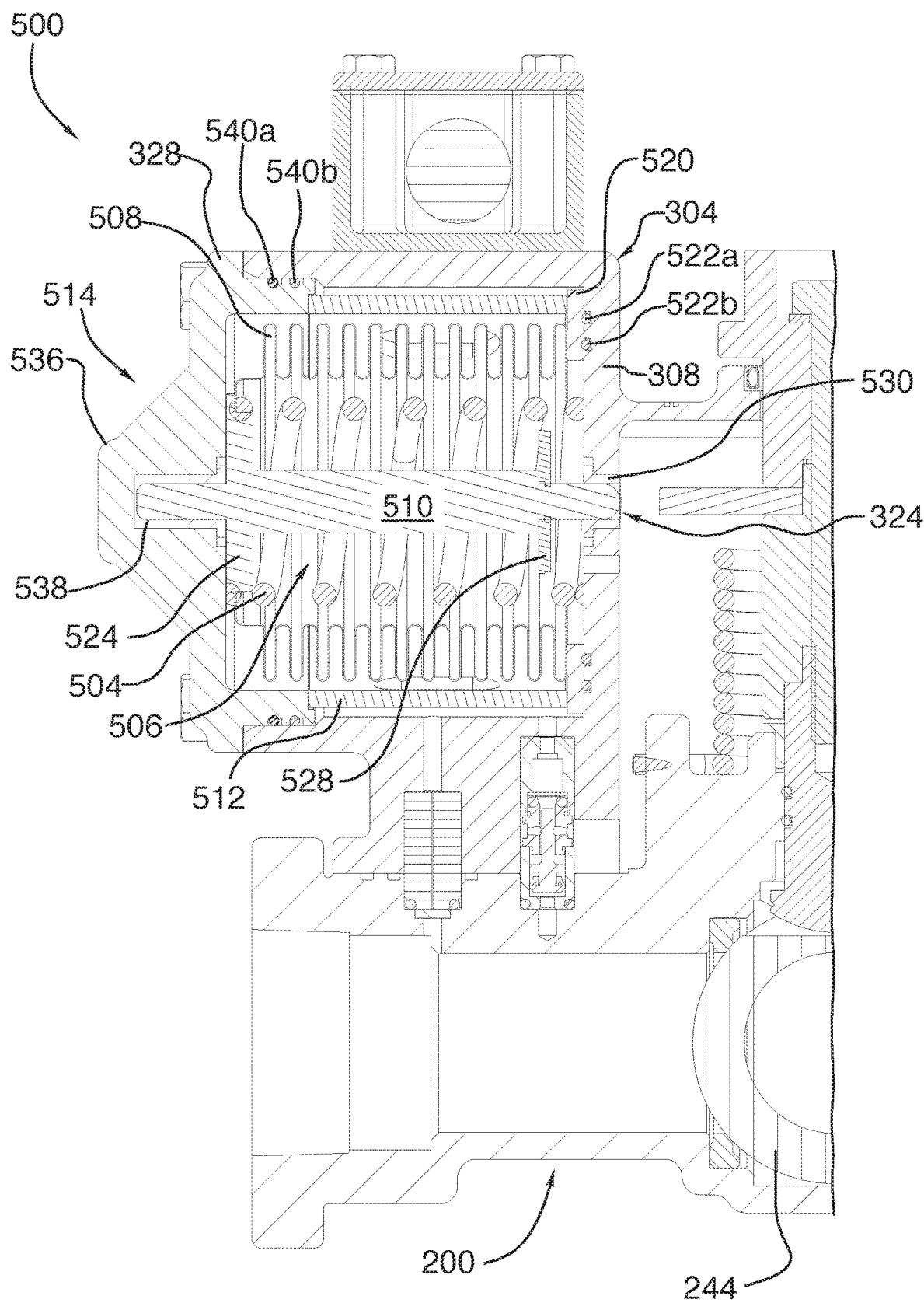
FIG. 18 is a cut out cross-sectional view of the shut-off valve, taken along the line I-I' of FIG. 3, illustrating the biasing assembly located in the second pressure chamber of the casing according to one embodiment.
Figure 19:
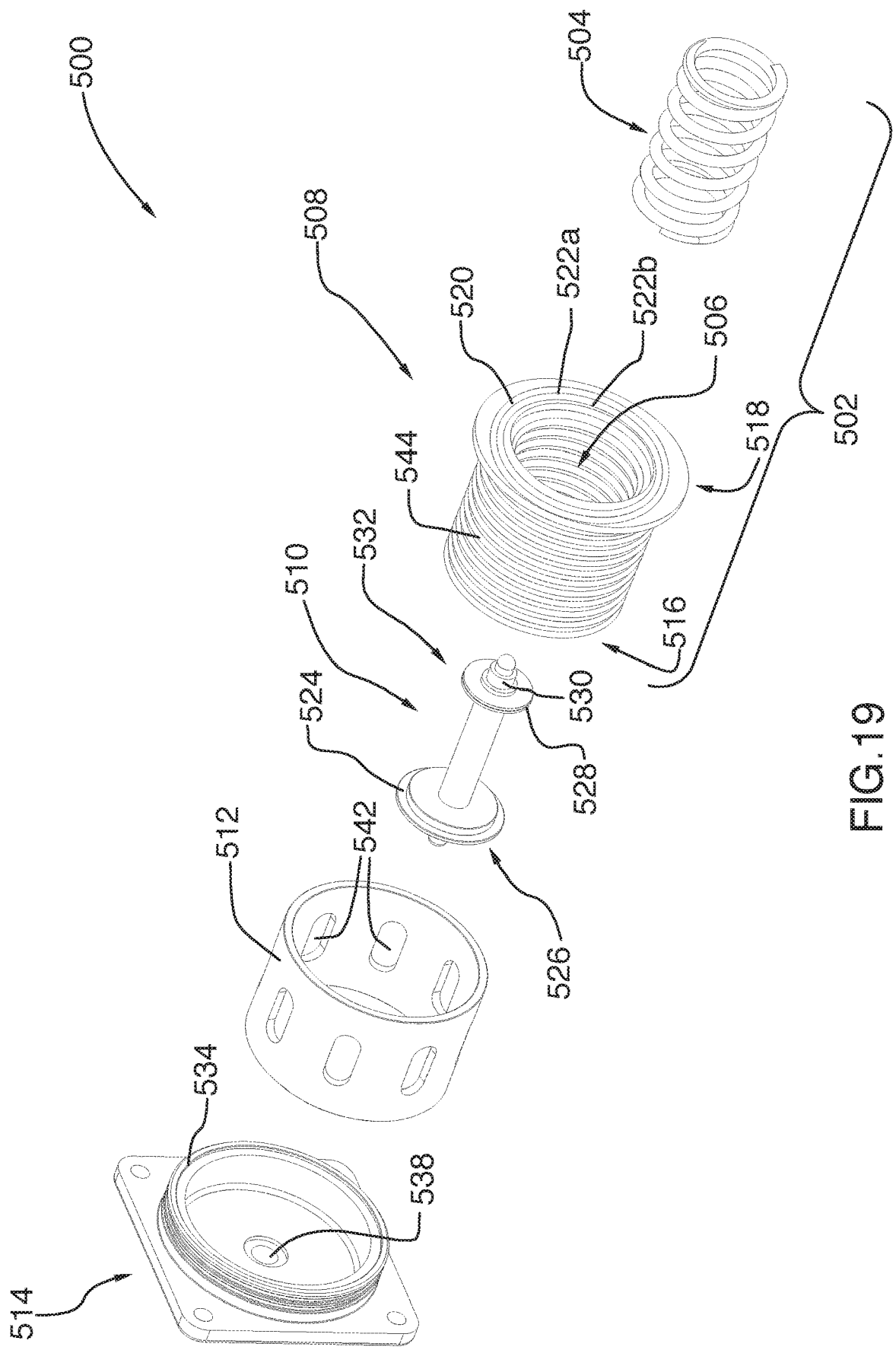
FIG. 19 is a right side exploded perspective view of the biasing assembly showing a cover, a circular spacer, a protrusion member and a second biasing member according to one embodiment.
Figure 20:
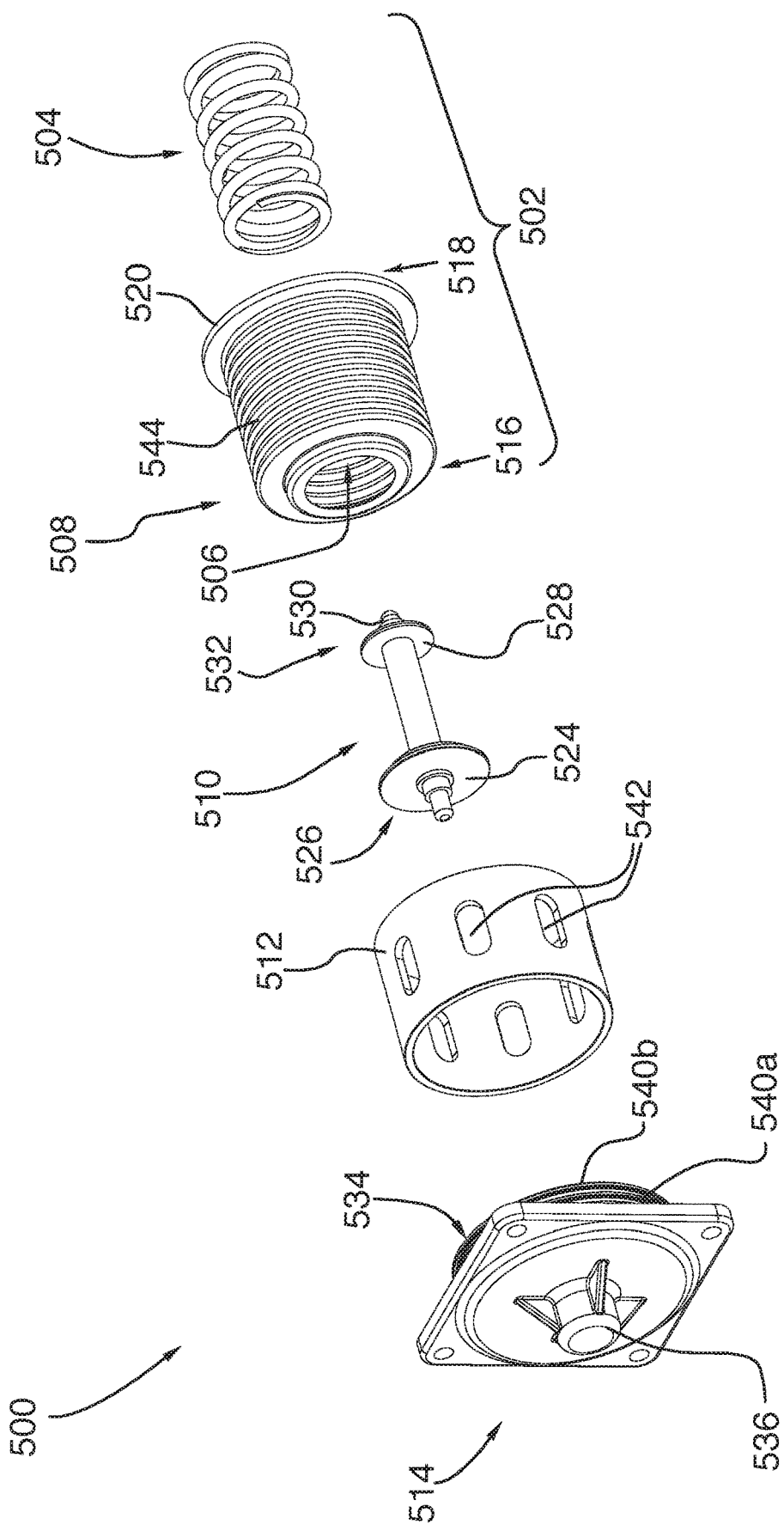
FIG. 20 is a left side perspective view of the biasing assembly of FIG. 19 according to one embodiment.

With reference to FIGS. 18 to 20, the shut-off valve 100 further comprises a biasing assembly 500 located in the second pressure chamber 304 and configured to maintain the valve member 244 in the open position.

The biasing assembly 500 comprises a second biasing member 502 consisting of a compression spring 504 concentrically located in a cavity 506 of a tubular bellow 508. The biasing assembly 500 further comprises a protrusion member 510, partially located inside the cavity 506 and operatively secured to the tubular bellow 508. The biasing assembly 500 further comprises a circular spacer 512 concentrically positioned around the tubular bellow 508 and a cover 514 sealingly secured to the end flange 328 of the second pressure chamber 304.

The tubular bellow 508 extends between an open first end 516 and an abutting second end 518 comprising an annular abutment flange 520 for abutting against the wall 308.

The annular abutment flange 520 comprises sealing members 522a and 522b, such as O-rings, for sealing against the wall 308. The protrusion member 510 comprises a pin partially positioned in the cavity 506 of the tubular bellow 508 and aligned with the first aperture 324 of the wall 308. The protrusion member 510 comprises a disc 524 at a first end 526, operatively secured to the open first end 516 of the tubular bellow 508. In one embodiment shown in FIG. 18, the disc 524 is welded to the open first end 516 of the tubular bellow 508 for sealing the cavity 506 thereof. The protrusion member 510 further comprises a sealing washer 528 and a sleeve bearing 530 at a second end 532 for providing seal fitting in the first aperture 324 of the wall 308.

In one embodiment, the tubular bellow 508 is compressed under an increase of pressure in the second pressure chamber 304 in the direction towards the first chamber 302. The compression of the tubular bellow 508, compresses the compression spring 504 and axially moves the protrusion member 510 such that it protrudes from the second pressure chamber 304 into the first chamber 302 through the first aperture 324. In this embodiment, the protrusion member 510 engages the mating element 424c of the blocking member 408 to maintain the valve member 244 in the open position. As the pressure in the second pressure chamber 304 decreases, the compression spring 504 creates a force on the disc 524 of the protrusion member 510 which expands the tubular bellow 508 in the opposite direction. The protrusion member 510 therefore disengages from the mating element 424c and retracts into the second pressure chamber 304. In this embodiment, the protrusion member 510 is clear from the mating element 424c of the blocking member 408. A skilled addressee will appreciate that when the tubular bellow 508 expands, the protrusion member 510 could be retracted into the second pressure chamber 304 only partially and still extend partially therefrom through the first aperture 324, as long as it is clear from the mating element 424c.

In one embodiment and as shown in FIGS. 18 and 19, the cover 514 has a generally square shape comprising a circular flange 534 adapted to be secured to the end flange 328 of the second pressure chamber 304. The cover 514 further comprises a protruding housing 536 defining a cavity 538, sized and shaped to receive the first end 526 of the protrusion member 510 as it retracts in the second pressure chamber 304. In this embodiment, the circular flange 534 of the cover 514 is screwed onto the end flange 328 of the second pressure chamber 304 and sealed using sealing members 540a and 540b such as O-rings. It will be understood by the skilled addressee that other sealing members may be used.

As shown in FIG. 18 and in accordance with one embodiment, the circular spacer 512 is concentrically mounted around the tubular bellow 508 in the second pressure chamber 304. As the cover 514 is secured to the second pressure chamber 304, the circular spacer 512 provides an interference fit between the circular flange 534 of the cover 514 and the annular abutment flange 520 of the tubular bellow 508. In this embodiment, the interference fit creates a force that tightly seals the annular abutment flange 520 against the wall 308. The circular spacer 512 comprises a plurality of circularly distributed openings 542, shown in FIGS. 19 and 20, providing fluid access to the outside surface 544 of the tubular bellow 508 for exerting pressure thereon. It will be understood by the skilled addressee that the number of circularly distributed openings 542 may vary.

Although not shown, it will be understood by the skilled addressee that in an alternative embodiment, the tubular bellow 508 may be expanded under an increase of pressure and compressed under a decrease of pressure. In such an embodiment, the annular abutment flange 520 of the tubular bellow 508 is positioned against the flange 534 of the cover 514. The tubular bellow 508 comprises an opening, not shown, for providing fluid access to the cavity 506 thereof. As fluid penetrates the cavity 506 through the opening, pressure builds up in which expands the tubular bellow 508 and the compression spring 504. This expansion axially moves the protrusion member 510 through the first aperture 324 and into the mating element 424c of the blocking member 408. As the fluid pressure in the cavity 506 decreases, the pulling force of the compression spring 504 retracts the tubular bellow 508 which disengages the protrusion member 510 from the mating element 424c.

In one embodiment, the skilled addressee will appreciate that the compression spring 504 installed within the tubular bellow 508 ensures that the tubular bellow 508 expands and retracts appropriately within the second pressure chamber 304. This is for instance the case when the spring rate of the tubular bellow 508 is compromised by the environment or by exceedingly high pressures that deform the tubular bellow 508.

In an alternative embodiment, not shown, the skilled addressee will appreciate that the compression spring 504 may be omitted and that the spring rate of the tubular bellow 508 itself may be adjusted to expand and retract within the second pressure chamber 304.

In an alternative embodiment, the tubular bellow 508 may be replaced by a diaphragm actuator such as those known to the skilled addressee.

In one embodiment, the tubular bellow 508 is made of rubber, the cover 514 is made of malleable iron such ASTM A197, the circular spacer 512 is made of a plastic polymer such as polyethylene high-density (PEHD). The skilled addressee will appreciate that other materials may be used.

In one embodiment, the tubular bellow 508 is compressed/expanded under a pressure ranging from 60 psi to 175 psi. The skilled addressee will appreciate that other pressure ranges may be considered.

Figure 21:
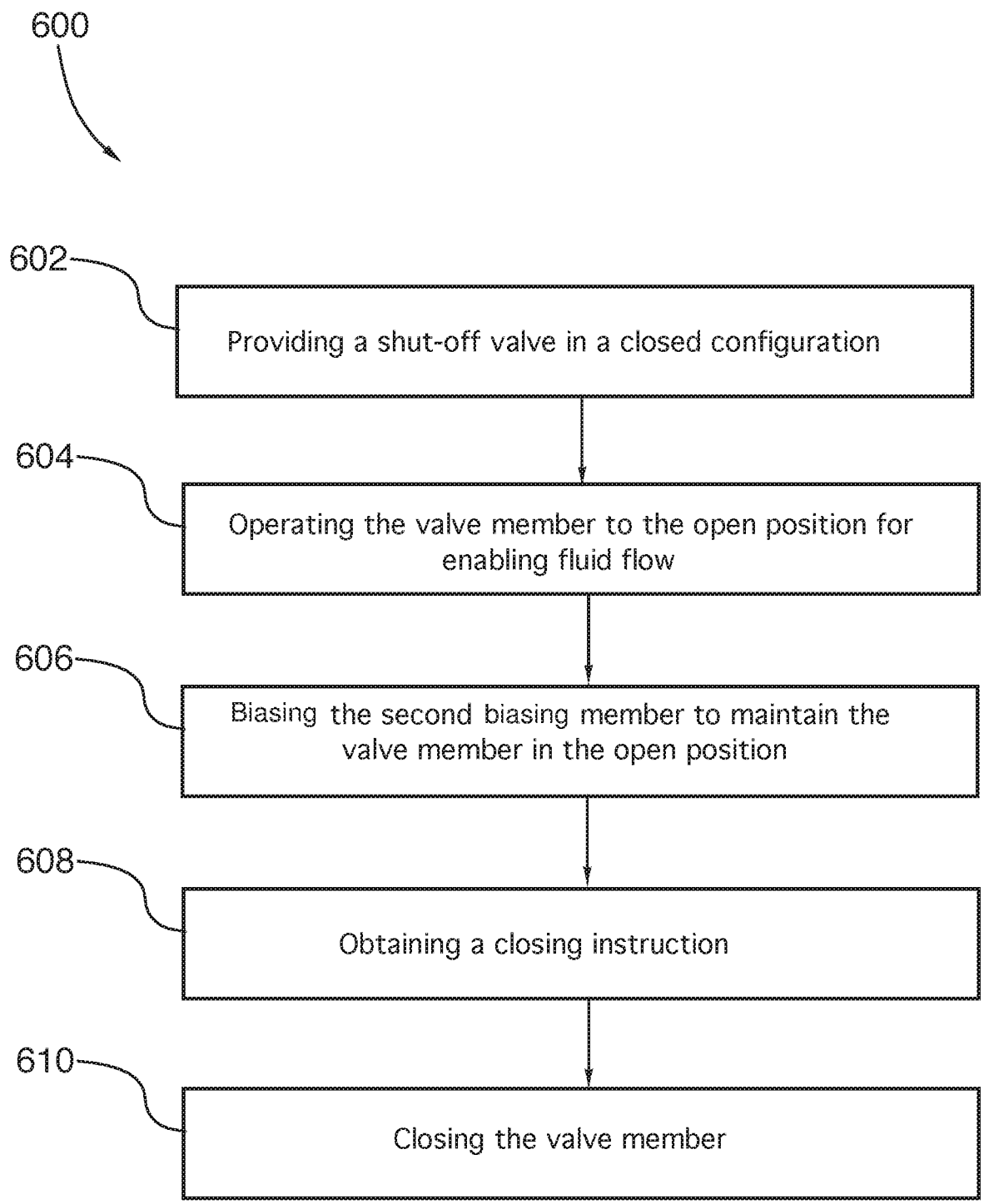
FIG. 21 is a block diagram of a method for operating the shut-off valve according to one embodiment.

With reference to FIG. 21, a method 600 for operating the shut-off valve 100 is described.

Figure 22:
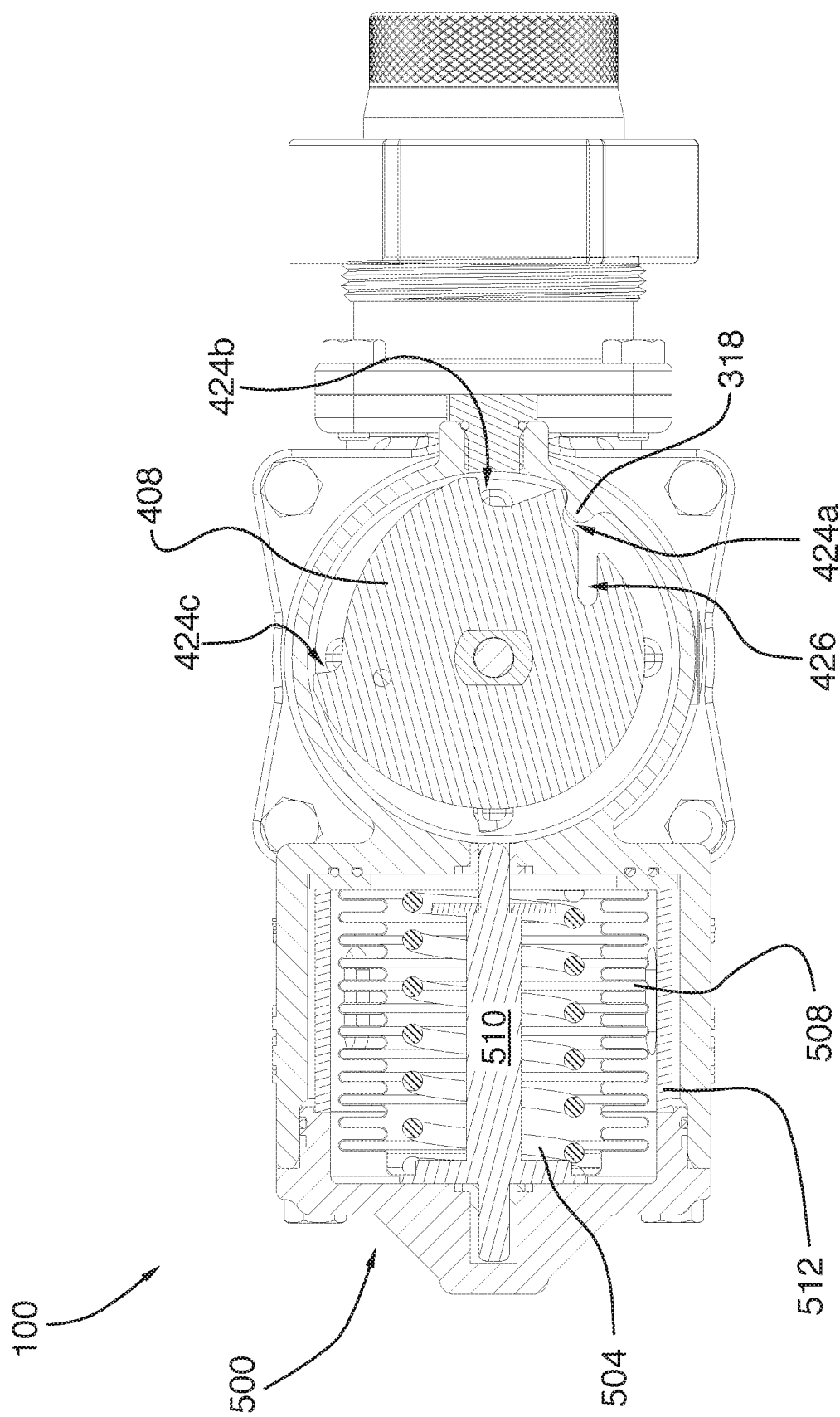
FIG. 22 is a top partially cut out view of the shut-off valve in the closed position, taken along line II-II' of FIG. 4 according to one embodiment.

According to step 602, the shut-off valve 100 is initially provided in a closed position, as shown in FIG. 22. In this configuration, the valve member 244 prevents fluid flow in the fluid passageway 202 and the first and second biasing members 428 and 502 are unbiased.

According to step 604, the valve member 244 is operated to the open position for enabling fluid flow in the fluid passageway 202.

More precisely and in one embodiment, an operator manually rotates the handle 436 for opening the shut-off valve 100. The rotating motion of the handle 436 is transferred to the blocking member 408 and to the stem 402 which rotates the valve member 244 about the rotation axis A to the open position. In the open position, the mating member 424c of the blocking member 408 is aligned with the first aperture 324 and the first biasing member 428 is in a biased state.

Alternatively and in accordance with another embodiment, the stem 402 is actuated by a motor for rotating the valve member 244.

Figure 23:
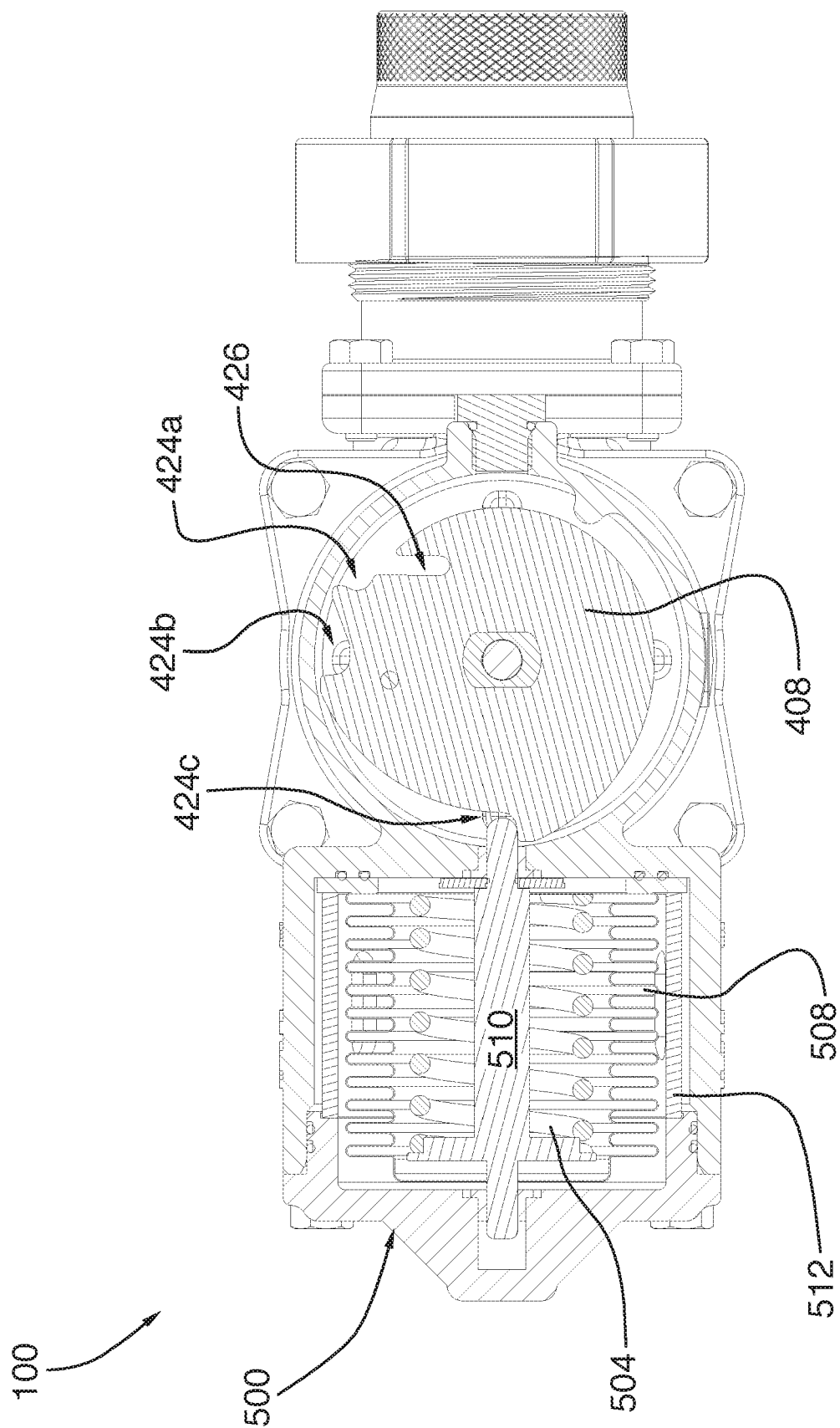
FIG. 23 is a top partially cut out view of the shut-off valve in the open position, taken along line II-II' of FIG. 4 according to one embodiment.

According to step 606, the second biasing member 502 is biased to maintain the valve member 244 in the open position. As fluid further flows in the fluid passageway 202 and through the checked orifice 222, it pressurizes the second pressure chamber 304. As the pressure in the second pressure chamber 304 increases to a first given value, for instance 60 psi, the tubular bellow 508 is compressed which axially moves the protrusion member 510 through the first aperture 324 and in contact with the mating element 424c of the blocking member 408, as shown in FIG. 23. This maintains the valve member 244 in the open position and prevents the first biasing member 428 from rotating the blocking member 408 to the closed position. In this embodiment, the second biasing member 502 is in a biased state and the biasing assembly 500 is in an engaged configuration.

In an alternative embodiment, not shown, the checked orifice 222 is replaced by a pressure sensor for measuring the pressure in the fluid passageway 202. As the pressure reaches a first given value, such as for instance 60 psi, an actuator, not shown, located in the second pressure chamber 304 is activated to move the protrusion member 510 into the mating element 424c of the blocking member 408 for maintaining the valve member 244 in the open position.

The skilled addressee will appreciate that the first given value may be different than 60 psi.

According to step 608, a closing instruction is obtained when a given condition is met. For instance and in one embodiment, when a pressure regulator on the fluid circuit fails, pressure in the fluid circuit rises above a second given value and an over pressure condition is met which triggers the shut-off valve 100 to automatically shut-off. Similarly, when the temperature of the ambient environment rises above a given temperature value, for example in the case of a fire, an over temperature condition is met which triggers the shut-off valve 100 to automatically shut-off.

In another embodiment, the closing instruction comprises an electrical signal received by the remote controlled unit 350 to activate the solenoid valve to close the shut-off valve 100.

In one embodiment, the second given value is 175 psi and the given temperature value is 165° F.

Alternatively, the skilled addressee will appreciate that the second given value may be different than 175 psi and the given temperature value may be different than 165° F.

According to step 610, the closing instructions causes the valve member 244 to be rotated to its closed position. More precisely, the pressure in the second pressure chamber 304 is decreased to close the shut-off valve 100. In such embodiment, the compression spring 504 exerts a force on the protrusion member 510 to axially expand the tubular bellow 508, thus disengaging the protrusion member 510 from the mating element 424c. The blocking member 408 is therefore free to be rotated by the first biasing member 428 which engages the stem 402 to rotate the valve member 244 to the closed position. The biasing assembly 500 is therefore in a non-engaged configuration.

In one embodiment, the decrease of pressure in the second pressure chamber 304 is caused by a fluid leak from the second pressure chamber 304.

In an over pressure condition, the over pressure fluid is fed from the fluid circuit to the pressure relief valve 226 through the fluid input 224. The over pressure fluid actuates the pressure relief valve 226 to shift from a closed position to an open position wherein pressurized fluid from the second pressure chamber 304 urges to the first chamber 302 and exits to the ambient environment through the first venting member 322. Therefore, the pressure in the second pressure chamber 304 is decreased which ultimately enables the valve member 244 to rotate to the closed position, as described above.

In an over temperature condition, such as in the case of a fire, the pin core of the fusible plug 348 melts which enables the pressurized fluid from the second pressure chamber 304 to travel through the second aperture 346 and exit out to the ambient environment. Therefore, the pressure in the second pressure chamber 304 is decreased which ultimately enables the valve member 244 to rotate to the closed position, as described above.

In another embodiment, the shut-off valve 100 is remotely operated via the remote controlled unit 350 to the closed position. In this embodiment, a communication device sends a closing instruction to the remote controlled unit 350. For instance, in the embodiment where the remote controlled unit 350 comprises a solenoid valve, the closing instruction comprises an electrical signal that triggers the retraction of an actuation member, such as a spring, not shown. The spring moves a closing member such as a plunger, not shown, away from the second aperture 346 to thereby open the second aperture 346 which enables the pressurized fluid from the second pressure chamber 304 to exit to the ambient environment via the second venting member 352. Therefore, the pressure in the second pressure chamber 304 is decreased which ultimately enables the valve member 244 to rotate to the closed position, as described above.

Figure 24:
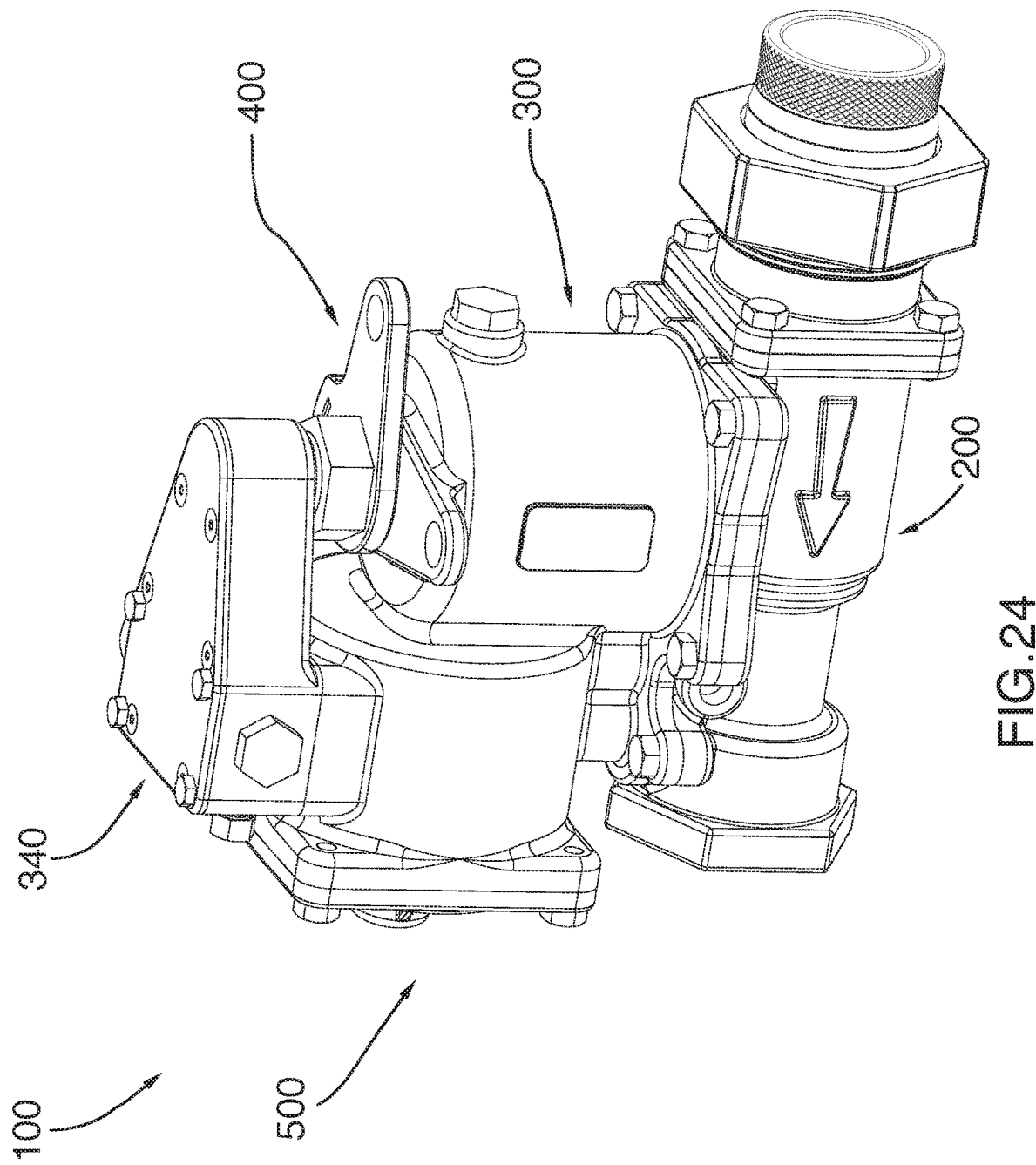
FIG. 24 is a perspective view of a second embodiment of the shut-off valve.
Figure 25:
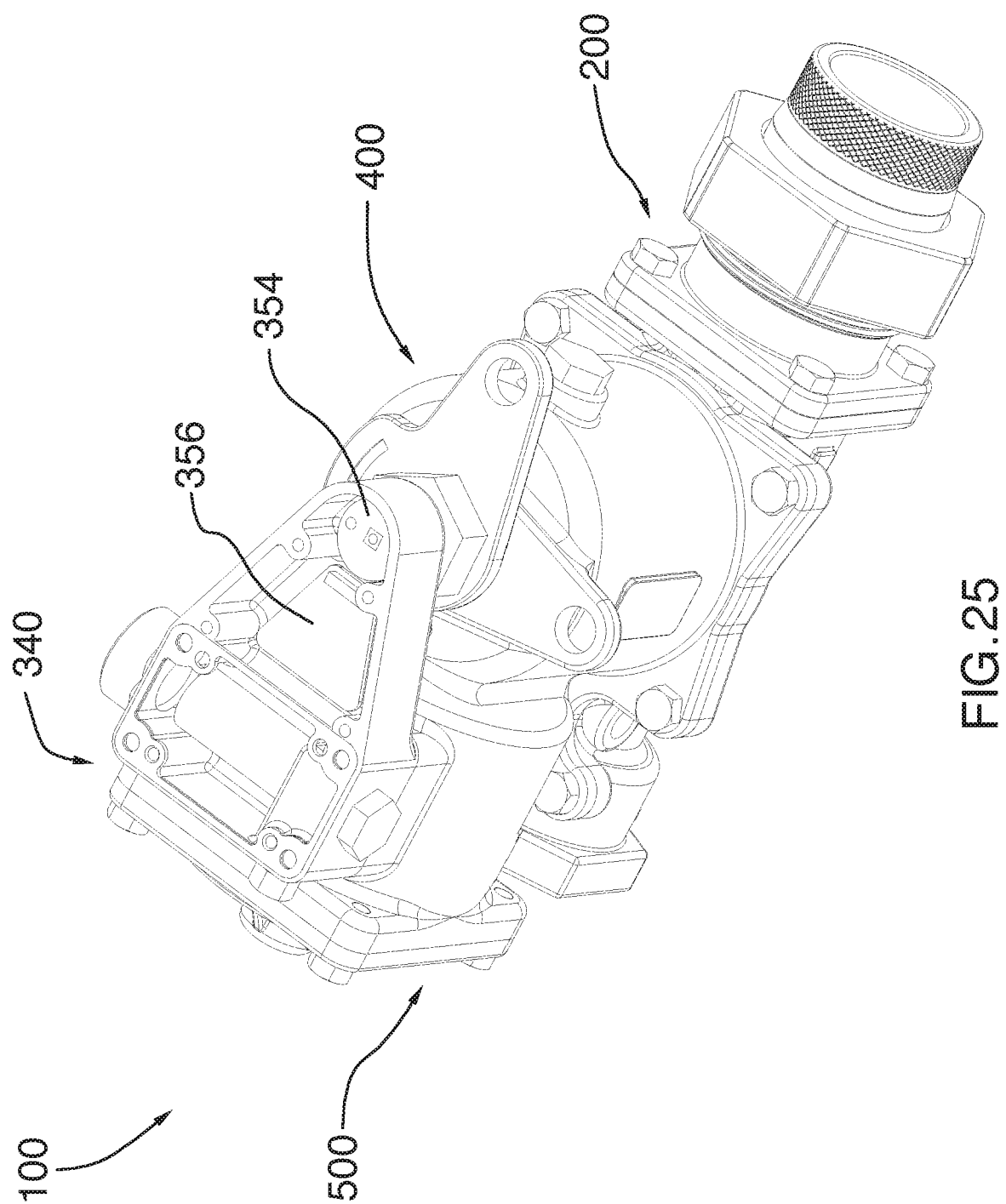
FIG. 25 is a partially cut out top perspective view of the shut-off valve of FIG. 24 showing a compartment for receiving an electronic module and a position sensor, according to a second embodiment.

In an alternative embodiment shown in FIGS. 24 and 25, the compartment 340 may further comprise a position sensor 354 operatively mounted on the nut shaped upper portion 448 of the handle 436 to accurately report the actual position of the valve member 244, i.e. open or closed. The compartment 340 may further comprise an electronic module 356 adapted to wirelessly communicate to a remote communication device, such as a smartphone, a tablet or a computer, for operating the remote controlled unit 350. The electronic module 356 may communicate with the communication device using Wi-Fi, Bluetooth or any other wireless protocol known to the skilled addressee.

In an alternative embodiment, not shown, the shut-off valve 100 may operate in a low pressure configuration. In this configuration, the second pressure chamber 304 does not fluidly communicate with the fluid passageway 202 and the valve body 200 does not comprise the checked orifice 222 and the pressure relief valve 226. Therefore, an operator manually pressurizes the second pressure chamber 304 to a pressure range, for instance between 10 psi and 300 psi, to bias the second biasing member 502 to move the protrusion member 510 in the mating element 424c. The valve member 244 remains in the open position until the fluid leaks or is released from the second pressure chamber 304. In this situation and as explained above, the decrease of pressure in the second pressure chamber 304 disengages the protrusion member 510 from the mating element 424c enabling the first biasing member 428 to rotate the blocking member 408 and the stem 402 to close the valve member 244.

The skilled addressee will appreciate that the pressure range may be different than between 10 psi and 300 psi.

It will be appreciated that an advantage of the shut-off valve 100 disclosed herein is that the shut-off valve 100 enables an automatic shutdown of a fluid circuit upon detection of an over pressure condition. This may be the case, for instance, when a pressure regulator fails on a fluid circuit.

It will be further appreciated that another advantage of the shut-off valve 100 disclosed herein is that the shut-off valve 100 may enable an automatic shutdown of the fluid circuit upon detection of an over temperature condition. This may be the case, for instance, in the case of a fire.

It will be further appreciated that another advantage of the shut-off valve 100 disclosed herein is that the shut-off valve 100 may be remotely operated using a motor for rotating the valve member 244.

It will be further appreciated that another advantage of the shut-off valve 100 disclosed herein is that shut-off valve 100 may be remotely closed using the remote controlled unit 350.

It will be further appreciated that another advantage of the shut-off valve 100 disclosed herein is that in an embodiment, when the shut-off valve 100 is used in combination with the position sensor 354, the position sensor 354 may provide an accurate status of the position of the valve member 244 to a remote user.

Although the above description relates to a specific preferred embodiment as presently contemplated by the inventor, it will be understood that the invention in its broad aspect includes structural and functional equivalents of the elements described herein.

Clause 1. A shut-off valve for a fluid circuit, the shut-off valve comprising:
  a) a valve body comprising a fluid passageway extending between an inlet and an outlet, the valve body comprising a valve seat located in the fluid passageway and adapted to receive a corresponding valve member rotatable about a rotation axis between an open position wherein the inlet is in fluid communication with the outlet and a closed position;
  b) a casing mounted on the valve body and comprising a chamber, the chamber being in fluid communication with the fluid passageway and comprising a first aperture and a second aperture;
  c) a valve actuating assembly mounted on the valve member for rotating the valve member between the open position and the closed position, the valve actuating assembly comprising:
   i) a stem operatively mounted on the valve member about the rotation axis;
   ii) a blocking member mounted on the stem and comprising a mating element;
   iii) a first biasing member configured to bias the valve actuating assembly in the closed position;
  d) a biasing assembly located in the chamber of the casing and configured for maintaining the valve member in the open position, the biasing assembly comprising a second biasing member and a protrusion member, the protrusion member adapted for mating with the mating element, the protrusion member secured to the second biasing member, the biasing assembly adapted to move between an engaged configuration, wherein the protrusion member extends from the chamber through the first aperture towards the mating element of the blocking member and a non-engaged configuration, wherein the protrusion member is disengaged from the mating element;

wherein as the valve actuating assembly rotates the valve member to the open position, pressure in the chamber biases the biasing assembly to the engaged configuration thereby urging the protrusion member into the mating element of the blocking member for maintaining the valve member in the open position and further wherein as the pressure in the chamber decreases the biasing assembly is moved to the non-engaged configuration and the first biasing member rotates the valve member to the closed position.

Clause 2. The shut-off valve as claimed in clause 1, wherein the second biasing member is any one of expanded and compressed when the biasing assembly is in the engaged configuration.

Clause 3. The shut-off valve as claimed in any one of clauses 1 and 2, wherein the protrusion member comprises a pin.

Clause 4. The shut-off valve as claimed in any one of clauses 1 to 3, wherein the blocking member comprises a cam plate.

Clause 5. The shut-off valve as claimed in clause 4, wherein the cam plate comprises a plurality of mating elements.

Clause 6. The shut-off valve as claimed in clause 5, wherein the mating elements comprise notches which are located at a periphery of the cam plate.

Clause 7. The shut-off valve as claimed in any one of clauses 1 to 6, wherein the first biasing member is secured between the valve body and any one of the stem and the blocking member.

Clause 8. The shut-off valve as claimed in any one of clauses 1 to 7, wherein the chamber is in fluid communication with the fluid passageway via a checked orifice.

Clause 9. The shut-off valve as claimed in any one of clauses 1 to 8, further comprising at least one pressure relief member mounted on the chamber and adapted to release the pressure from the chamber to an ambient environment through the second aperture when any one of pressure in the fluid circuit and ambient temperature is above a given value, thereby moving the valve member to the closed position.

Clause 10. The shut-off valve as claimed in clause 9, wherein the at least one pressure relief member is selected from a group consisting of a fusible plug and a pressure relief valve.

Clause 11. The shut-off valve as claimed in any one of clauses 1 to 10, further comprising a remote controlled unit for selectively releasing pressure from the chamber to an ambient environment, the remote controlled unit comprising an actuation member and a closing member, wherein upon reception of a closing instruction, the actuation member operates the closing member for releasing pressure from the chamber through the second aperture to the ambient environment, thereby moving the valve member to the closed position.

Clause 12. The shut-off valve as claimed in clause 11, wherein the remote controlled unit comprises a solenoid valve mounted on the chamber, the solenoid valve comprising the actuation member connected to the closing member, the closing member adapted to close the second aperture of the chamber, further wherein upon reception of the closing instruction, the actuation member moves the closing member away from the second aperture causing the second aperture to be open and thereby releasing pressure from the chamber through the second aperture to the ambient environment.

Clause 13. The shut-off valve as claimed in any one of clauses 1 to 12, wherein the valve actuating assembly further comprises any one of a handle and a motor mounted on the stem for rotating the valve member.

Clause 14. A shut-off system for a fluid circuit, the shut-off system comprising:
a valve member located in a fluid passageway of a valve body, the valve member movable between an open position for enabling fluid flow in the fluid passageway and a closed position;
a valve actuating unit for selectively moving the valve member between the closed position and the open position;
a detection unit for providing an indication of a pressure in the fluid passageway and in the fluid circuit;
a biasing unit operatively connected to the valve actuating unit and to the detection unit, the biasing unit for maintaining the valve actuating unit in the open position if the indication of a pressure in the fluid passageway reaches a first given value and wherein if the indication of a pressure in the fluid circuit reaches a second given value, the biasing unit releases the valve actuating unit for moving the valve member to the closed position.

Clause 15. The system as claimed in clause 14, wherein the detection unit further provides an indication of an ambient temperature to the biasing unit, and further wherein if the indication of the ambient temperature is above a given temperature value, the biasing unit releases the valve actuating unit for moving the valve member to the closed position.

Clause 16. The system as claimed in any one of clauses 14 and 15, wherein the biasing unit is capable of receiving a closing instruction for selectively releasing the valve actuating unit to move the valve member to the closed position.

Clause 17. A method for operating a shut-off valve, the method comprising:
providing the shut-off valve of any one of clauses 1 to 8 in a closed position;
operating the valve member to the open position for enabling fluid flow;
biasing the second biasing member to maintain the valve member in the open position;
obtaining a closing instruction; and
closing the valve member.

Clause 18. The method as claimed in clause 17, wherein the shut-off valve comprises any one of a motor and a handle mounted on the stem, further wherein the operating of the valve member to the open position for enabling fluid flow comprises actuating any one of the motor and the handle.

Clause 19. The method as claimed in any one of clauses 17 and 18, wherein the biasing of the second biasing member to maintain the valve member in the open position further comprises engaging the protrusion member with the mating element of the blocking member.

Clause 20. The method as claimed in any one of clauses 17 to 19, wherein the shut-off valve comprises at least one pressure relief member, further wherein the obtaining of a closing instruction comprises using the at least one pressure relief member for detecting if pressure in the fluid circuit is above a given pressure value.

Clause 21. The method as claimed in clause 20, wherein the obtaining of a closing instruction comprises using the at least one pressure relief member for detecting if the ambient temperature is above a given temperature value.

Clause 22. The method as claimed in any one of clauses 17 to 21, wherein the shut-off valve further comprises a remote controlled unit, the remote controlled unit comprising an actuation member connected to a closing member, the closing member adapted to operatively close the second aperture of the chamber, further wherein the obtaining of a closing instruction comprises receiving, by the remote controlled unit, an electrical signal from a communication device to actuate the remote controlled unit, further wherein the closing of the valve member comprises actuating the actuation member to thereby move the closing member away from the second aperture of the chamber causing the second aperture to be open and thereby releasing pressure from the chamber to an ambient environment through the second aperture.

Clause 23. The method as claimed in any one of clauses 20 and 21, wherein the closing of the valve member comprises actuating the at least one pressure relief member for releasing pressure from the chamber through the second aperture.

Clause 24 A kit for a shut-off valve according to clause 1.

The invention claimed is:

1. A shut-off valve for a fluid circuit, the shut-off valve comprising:
   a) a valve body comprising a fluid passageway extending between an inlet and an outlet, the valve body comprising a valve seat located in the fluid passageway and adapted to receive a corresponding valve member rotatable about a rotation axis between an open position wherein the inlet is in fluid communication with the outlet and a closed position;
   b) a casing mounted on the valve body and comprising a chamber, the chamber being in fluid communication with the fluid passageway and comprising a first aperture and a second aperture;
   c) a valve actuating assembly mounted on the valve member for rotating the valve member between the open position and the closed position, the valve actuating assembly comprising:
      i) a stem operatively mounted on the valve member about the rotation axis;
      ii) a blocking member mounted on the stem and comprising a mating element;
      iii) a first biasing member configured to bias the valve actuating assembly in the closed position;
   d) a biasing assembly located in the chamber of the casing and configured for maintaining the valve member in the open position, the biasing assembly comprising a second biasing member and a protrusion member, the protrusion member adapted for mating with the mating element, the protrusion member secured to the second biasing member, the biasing assembly adapted to move between an engaged configuration, wherein the protrusion member extends from the chamber through the first aperture towards the mating element of the blocking member and a non-engaged configuration, wherein the protrusion member is disengaged from the mating element;
   wherein as the valve actuating assembly rotates the valve member to the open position, pressure in the chamber biases the biasing assembly to the engaged configuration thereby urging the protrusion member into the mating element of the blocking member for maintaining the valve member in the open position and further wherein as the pressure in the chamber decreases the biasing assembly is moved to the non-engaged configuration and the first biasing member rotates the valve member to the closed position.

2. The shut-off valve as claimed in claim 1, wherein the second biasing member is any one of expanded and compressed when the biasing assembly is in the engaged configuration.

3. The shut-off valve as claimed in claim 1, wherein the protrusion member comprises a pin.

4. The shut-off valve as claimed in claim 1, wherein the blocking member comprises a cam plate.

5. The shut-off valve as claimed in claim 4, wherein the cam plate comprises a plurality of mating elements.

6. The shut-off valve as claimed in claim 5, wherein the mating elements comprise notches which are located at a periphery of the cam plate.

7. The shut-off valve as claimed claim 1, wherein the first biasing member is secured between the valve body and any one of the stem and the blocking member.

8. The shut-off valve as claimed claim 1, wherein the chamber is in fluid communication with the fluid passageway via a checked orifice.

9. The shut-off valve as claimed claim 1, further comprising at least one pressure relief member mounted on the chamber and adapted to release the pressure from the chamber to an ambient environment through the second aperture when any one of pressure in the fluid circuit and ambient temperature is above a given value, thereby moving the valve member to the closed position.

10. The shut-off valve as claimed in claim 9, wherein the at least one pressure relief member is selected from a group consisting of a fusible plug and a pressure relief valve.

11. The shut-off valve as claimed in claim 1, further comprising a remote controlled unit for selectively releasing pressure from the chamber to an ambient environment, the remote controlled unit comprising an actuation member and a closing member, wherein upon reception of a closing instruction, the actuation member operates the closing member for releasing pressure from the chamber through the second aperture to the ambient environment, thereby, moving the valve member to the closed position.

12. The shut-off valve as claimed in claim 11, wherein the remote controlled unit comprises a solenoid valve mounted on the chamber, the solenoid valve comprising the actuation member connected to the closing member, the closing member adapted to close the second aperture of the chamber, further wherein upon reception of the closing instruction, the actuation member moves the closing member away from the second aperture causing the second aperture to be open and thereby releasing pressure from the chamber through the second aperture to the ambient environment.

13. The shut-off valve as claimed in claim 1, wherein the valve actuating assembly further comprises any one of a handle and a motor mounted on the stem for rotating the valve member.

14. A method for operating a shut-off valve, the method comprising:
   providing the shut-off valve of claim 1 in a closed position;
   operating the valve member to the open position for enabling fluid flow;
   biasing the second biasing member to maintain the valve member in the open position;
   obtaining a closing instruction; and
   closing the valve member.

15. The method as claimed in claim 14, wherein the shut-off valve comprises any one of a motor and a handle mounted on the stem, further wherein the operating of the valve member to the open position for enabling fluid flow comprises actuating any one of the motor and the handle.

16. The method as claimed in claim 14, wherein the biasing of the second biasing member to maintain the valve member in the open position further comprises engaging the protrusion member with the mating element of the blocking member.

17. The method as claimed in claim 14, wherein the shut-off valve comprises at least one pressure relief member, further wherein the obtaining of a closing instruction comprises using the at least one pressure relief member for detecting if pressure in the fluid circuit is above a given pressure value.

18. A shut-off system for a fluid circuit, the shut-off system comprising:
   a valve member located in a fluid passageway of a valve body, the valve member movable between an open position for enabling fluid flow in the fluid passageway and a closed position;
   a valve actuating unit for selectively moving the valve member between the closed position and the open position;
   a detection unit for providing an indication of a pressure in the fluid passageway and in the fluid circuit;
   a biasing unit operatively connected to the valve actuating unit and to the detection unit, the biasing unit for maintaining the valve actuating unit in the open position if the indication of a pressure in the fluid passageway reaches a first given value and wherein if the indication of a pressure in the fluid circuit reaches a second given value, the biasing unit releases the valve actuating unit for moving the valve member to the closed position;
   wherein the detection unit further provides an indication of an ambient temperature to the biasing unit, and further wherein if the indication of the ambient temperature is above a given temperature value, the biasing unit releases the valve actuating unit for moving the valve member to the closed position.

19. The system as claimed in claim 18, wherein the biasing unit is capable of receiving a closing instruction for selectively releasing the valve actuating unit to move the valve member to the closed position.

* * * * *